(12) United States Patent
Tobari et al.

(10) Patent No.: US 7,075,266 B2
(45) Date of Patent: Jul. 11, 2006

(54) APPARATUS FOR CONTROLLING AN A. C. MOTOR

(75) Inventors: Kazuaki Tobari, Hitachiota (JP);
Tsunehiro Endou, Hitachiota (JP);
Yoshitaka Iwaji, Hitachinaka (JP);
Hidefumi Shirahama, Hitachi (JP);
Yasuo Notohara, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 10/809,530

(22) Filed: Mar. 26, 2004

(65) Prior Publication Data
US 2004/0189243 A1 Sep. 30, 2004

(30) Foreign Application Priority Data
Mar. 28, 2003 (JP) ............................. 2003-089571
Jul. 18, 2003 (JP) ............................. 2003-198838

(51) Int. Cl.
*H02P 23/00* (2006.01)
*H02P 25/00* (2006.01)
*H02P 27/00* (2006.01)
*H02P 27/04* (2006.01)

(52) U.S. Cl. .................. 318/807; 318/254; 318/255; 318/432; 318/434; 318/727; 318/599; 318/811

(58) Field of Classification Search ............... 318/807, 318/254, 255, 432, 434, 717, 599, 811
See application file for complete search history.

(56) References Cited

U.S. PATENT DOCUMENTS 6,107,774 A * 8/2000 Yamada et al. ............. 318/807
6,344,726 B1 * 2/2002 Tobari et al. ................ 318/727
6,396,229 B1 * 5/2002 Sakamoto et al. ........... 318/439
6,628,095 B1 * 9/2003 Mc Kinnon et al. ............ 318/3
6,650,081 B1 * 11/2003 Iwaji et al. .................. 318/700
6,670,786 B1 * 12/2003 Tobari et al. ................ 318/805
6,771,039 B1 * 8/2004 Sakurai et al. .............. 318/722

(Continued)

FOREIGN PATENT DOCUMENTS

JP 2001-251889 A 9/2001

OTHER PUBLICATIONS

"Development of full automatic washing machine which is controlled by an inverter." Institute of Electrical Engineers of Japan (IEEJ), 1999, pp. 5 (2 pgs Japanese, 1-3 Translation).

*Primary Examiner*—Rina Duda
*Assistant Examiner*—Erick Glass
(74) *Attorney, Agent, or Firm*—McDermott Will & Emery LLP

(57) ABSTRACT

A method controls a torque of an a. c. motor which does not cause a shortage of torque by using an economical current detection which estimates d- and q-axis currents Idc, Iqc from d. c. current IDC flowing through an input d. c. bus line of a power converter. A value of d- and q-axis motor currents Id, Iq of a rotational coordinate system are estimated from detected input d. c. current IDC flowing through the bus line of the power converter to which power is input from a d. c. power source 21. A output voltages of the power converter 2 are controlled so that the estimated currents Idc, Iqc are equal to respective current instruction values Id*, Iq*. Errors of motor constants are determined from information on the motor currents and the rotational phase errors by an operation.

18 Claims, 18 Drawing Sheets

U.S. PATENT DOCUMENTS 6,954,030 B1 * 10/2005 Kawase ...................... 313/495

2003/0128009 A1 * 7/2003 Sakurai et al. .............. 318/722

* cited by examiner

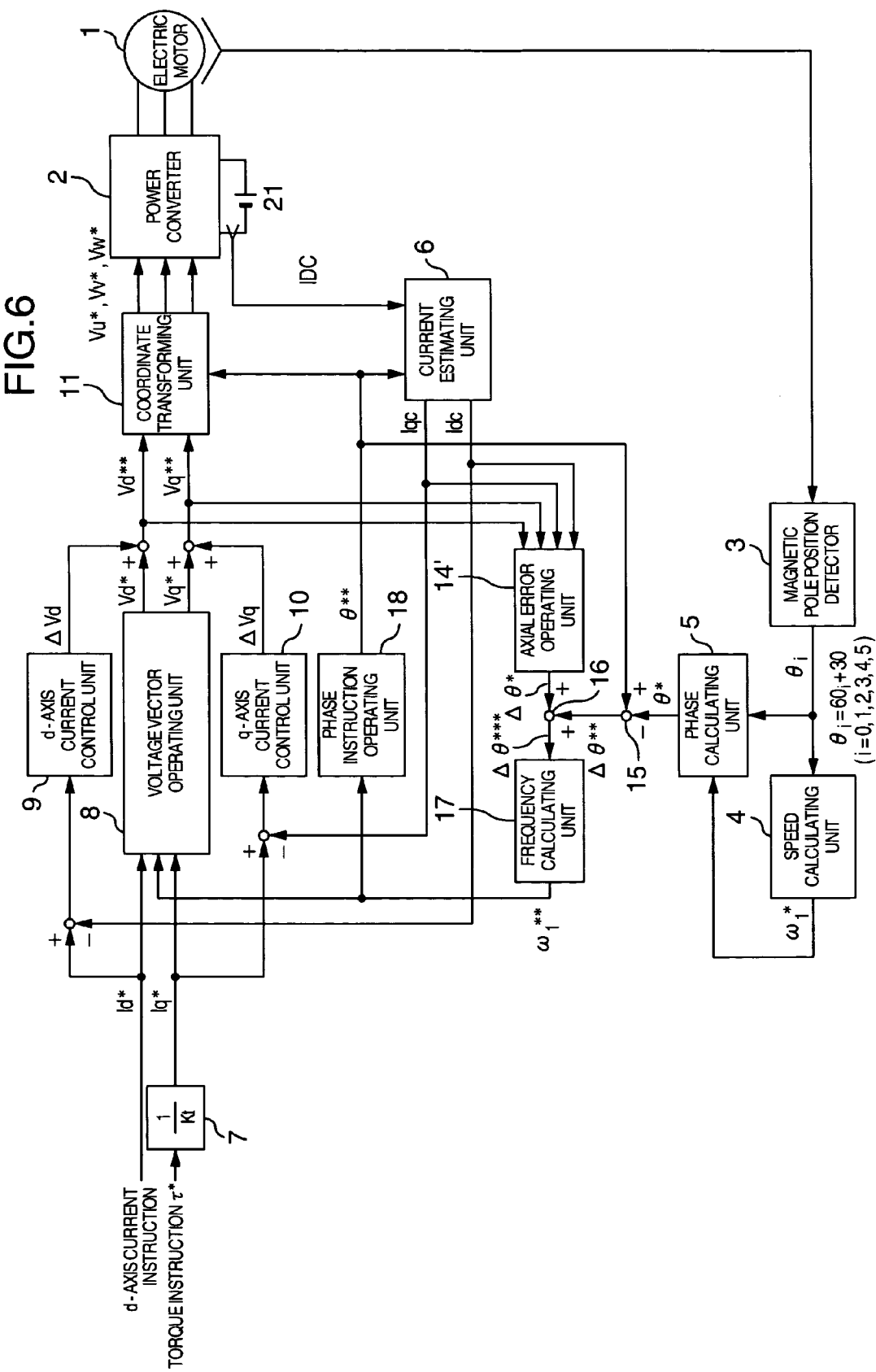

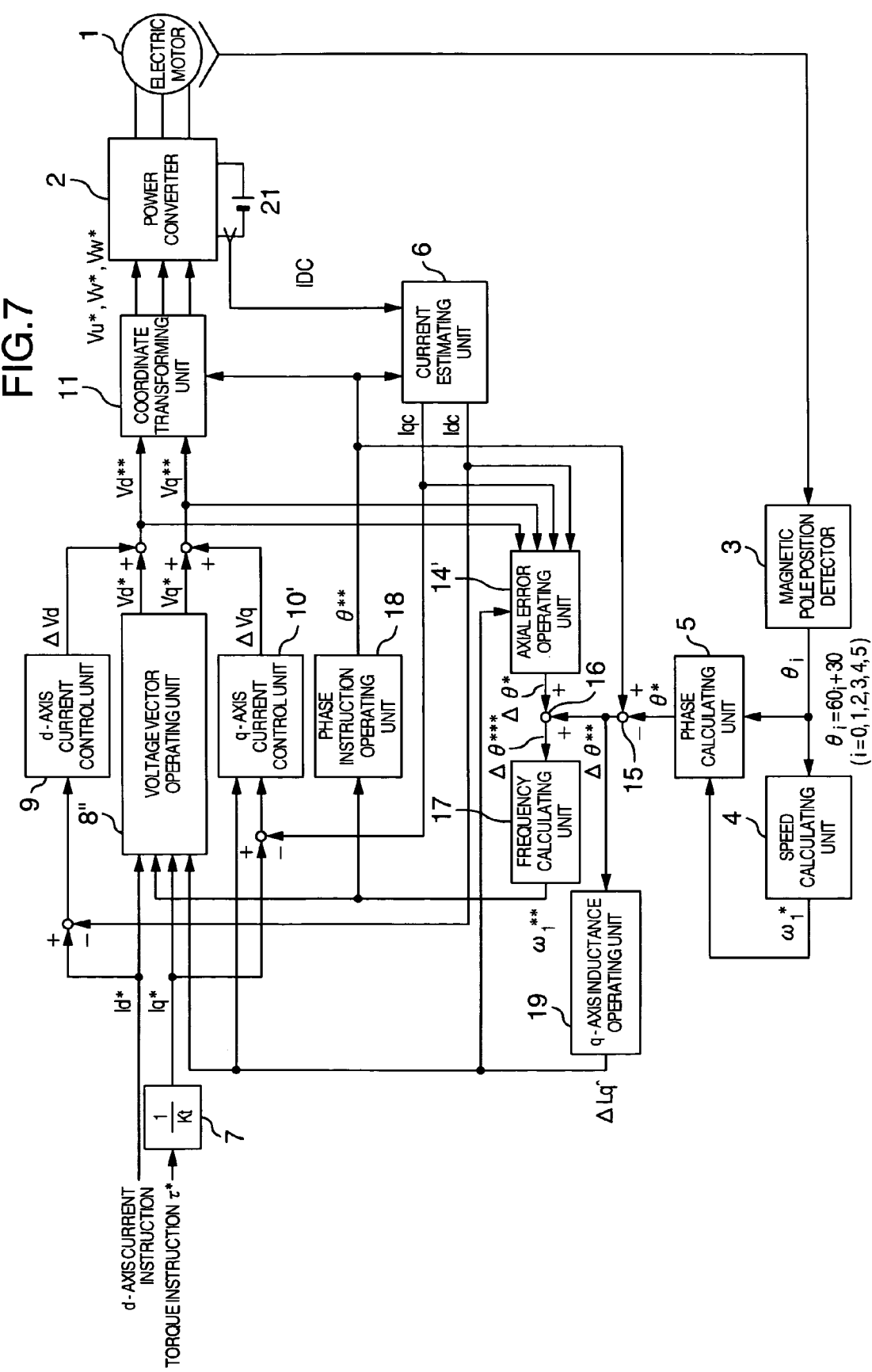

APPARATUS FOR CONTROLLING AN A. C. MOTOR

BACKGROUND OF THE INVENTION

The present invention relates to an apparatus for controlling an a. c. motor and a module using the same.

A study paper "Development of full automatic washing machine which is controlled by an inverter" reported in research meeting at Ibaraki Office of Tokyo Branch, The Institute of Electrical Engineers of Japan (IEEJ) (1999) describes "an open loop type vector control scheme" is utilized in an electric motor current sensorless, low resolution position detector.

Another prior art using a magnetic pole position detector and an electric motor current sensor is disclosed in JP-A-2000-324881 which teaches a control device. In this device an electric current detector directly detects currents flowing through windings of a motor for generating such a voltage instruction that an instructed current is equal to detected currents in a rotary coordinate system.

SUMMARY OF THE INVENTION

It is an object of the present invention to provide an apparatus for controlling an a. c. motor which does not cause a shortage of torque in a low speed range without being influenced by variations in constants of the motor and mounting errors of a Hall effect element and the like.

One of the features of the present invention resides in that motor currents Id, Iq on the d- and q-axes of a rotary coordinate system are estimated and the voltage output from a power converter are controlled so that the estimated currents Idc, Iqc are equal to respective current instruction values Id*, Iq*.

Another feature of the present invention resides in that an apparatus for controlling an a. c. electric motor comprises current estimating means which receives detected input d. c. currents from a power converter for converting d. c. power into a. c. power and the rotational phase which is obtained from a signal of detected position of the a. c. motor for outputting estimated current values of the a. c. motor on the d- and q-axes of the rotational coordinate system of the motor, d-axis current controlling means for controlling the d-axis current so that said estimated current value approaches the d-axis current instruction value, and q-axis current controlling means for controlling the q-axis current so that said estimated current value approaches the q-axis current instruction value.

Other objects, features and advantages of the invention will become apparent from the following description of the embodiments of the invention taken in conjunction with the accompanying drawings.

BRIEF DESCRIPTION OF THE DRAWINGS

FIG. 6 shows the configuration of a torque control circuit of a permanent magnet synchronization motor of a further embodiment of the present invention;

FIG. 7 shows the configuration of a torque control circuit of a permanent magnet synchronization motor of a further embodiment of the present invention;

DESCRIPTION OF THE EMBODIMENTS

Now, the present invention will be described by way of embodiments with reference to annexed drawings.

First Embodiment

Figure 1:
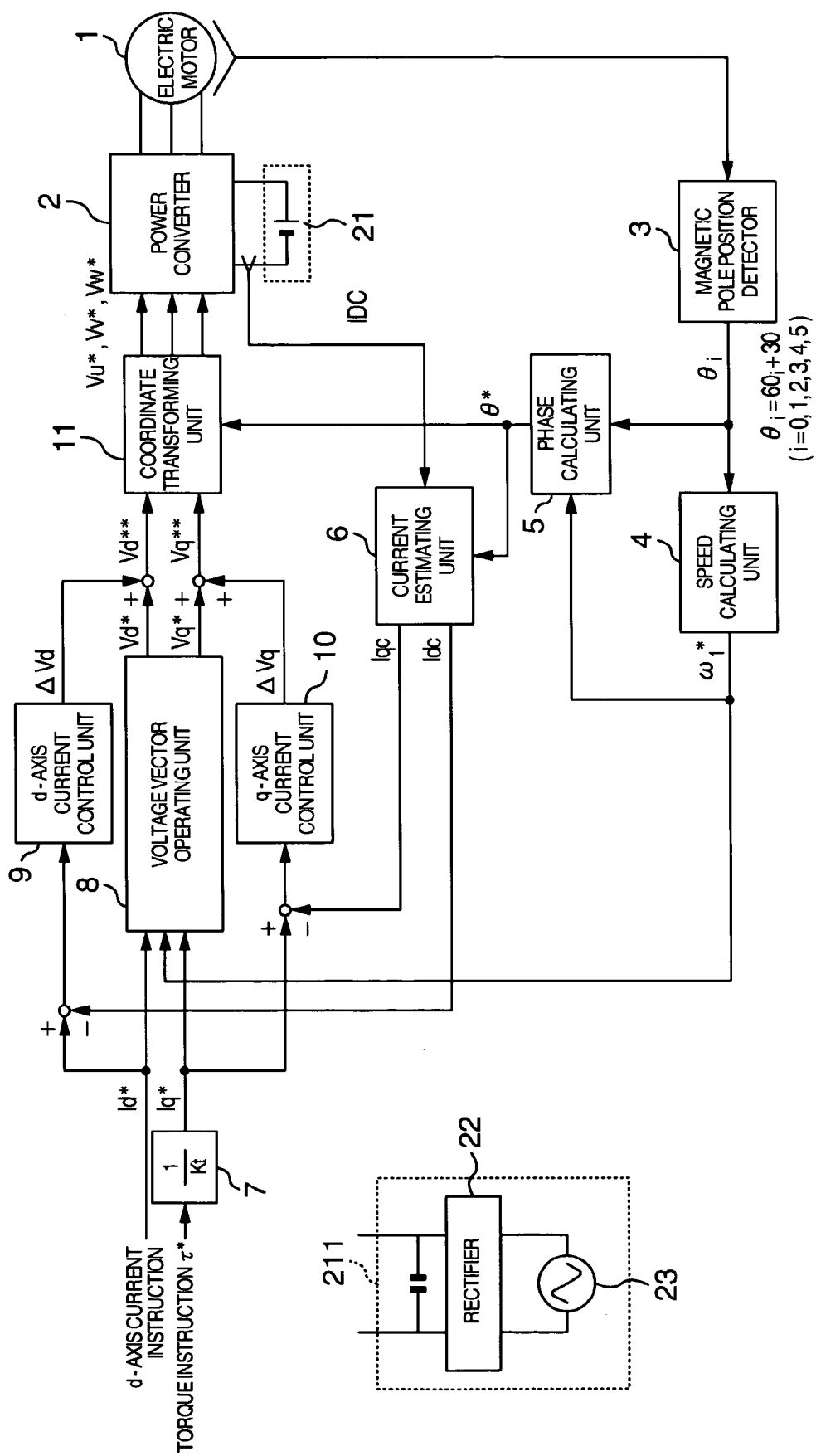
FIG. 1 shows the configuration of a torque control circuit of a permanent magnet synchronization motor of one embodiment of the present invention.

Referring now to FIG. 1, there is shown the configuration of an apparatus for controlling a permanent magnet synchronization electric motor which is an embodiment of the present invention. The apparatus comprises a power converter to which a power from a d. c. power source 21 is input, for outputting voltages which are proportional to three-phase a. c. voltage instruction values Vu*–Vw* to an permanent synchronization electric motor 1; a magnetic pole position detector 3 which is capable of detecting the position value θi at every electrical angle 60° of the permanent magnet synchronization electric motor 1; a speed calculating unit 4 for calculating the rotational speed ω1* of the motor 1 from the detected position value θi; a phase calculating unit 5 for calculating the rotational phase θ* of the motor 1 from the detected position value θi and the rotational speed ω1*; a current estimating unit 6 for calculating estimated current values Idc, Iqc on d-axis (corresponding to magnetic flux axis) and q-axis (corresponding to torque axis) of the rotational coordinate system from input d. c. bus current detected value IDC from the power converter 2; a conversion coefficient which is used for calculating the q-axis current instruction value Iq* from a torque instruction value τ*; a voltage vector operating unit 8 for operating voltage reference values Vd* and Vq* based upon constants of the motor, current instruction values Id* and Iq*, and the rotational speed ω1*; a d-axis current control unit 9 for outputting ΔVd as a function of the difference between the d-axis current instruction value Idc; a q-axis current control unit 10 for outputting ΔVq as a function of the difference between the q-axis current instruction value Iq* and the estimated q-axis current value Iqc; and a coordinate transforming unit 11 for outputting the voltage instruction values Vu*–Vw* of three-phase a. c. from the voltage reference values Vd*, Vq*, current control outputs ΔVd, ΔVq and the rotational phase θ* as shown in FIG. 1.

The d. c. power source 21 may be primary or secondary battery, or may be power from a capacitor or battery which is charged with a power obtained by rectifying commercial power or a. c. power output from a generator 23 as is done in a d. c. power source 211. Description of the d. c. power source will be omitted in the embodiments which will be described below since the d. c. power source can be formed similarly to the foregoing.

The torque instruction value τ* and the d-axis current instruction value Id* are determined by a host apparatus. For example, the torque instruction value τ* is determined depending upon the operation of input devices. The same will be applied to the embodiments which will be described.

Components 1 to 5, 7 and 11 are configured similarly to those for the open loop type vector control used in the low resolution position detector which is disclosed as speed control type in the cited prior art.

Firstly, the basic operation in which the open loop type vector control is applied to the torque control apparatus will be described.

In order to control the motor currents Iq, Id depending upon the q-axis current instruction value Iq* and the d-axis current instruction value Id* determined by the torque instruction value τ*, the d- and q-axis voltage reference values Vd* and Vq* are preliminarily calculated in the voltage vector operating unit 8 in accordance with equation (1) for controlling the output voltages from the converter.

$$\begin{pmatrix} Vd^{**} = R_1^* \cdot Id^{**} - \omega_1^* \cdot Lq^* \cdot Iq^{} \\ Vq^{} = R_1^* \cdot Iq^{**} + \omega_1^* \cdot Ld^* \cdot Id^{**} + \omega_1^* \cdot Ke^* \end{pmatrix} \quad (1)$$

wherein R1* denotes a preset resistance value, Ld* and Lq* denote preset values of d- and q-axis inductances, Ke* denotes a preset value of induced voltage constant, ω1* denotes the rotational speed.

The position of the magnetic pole at every 60° of the electric angle can be determined by the magnetic pole position detector 3. The detected position value θi at this time can be expressed in the present embodiment as follows:

$$\theta i = 60i + 30 \quad (2)$$

wherein i=0, 1, 2, 3, 4, 5.

The averaged rotational speed ω1* over a period of at least 60° can be calculated from the detected position value θi in the speed calculating unit 4 as follows:

$$\omega 1 = \Delta\theta/\Delta t \quad (3)$$

wherein Δθ is θi−θ(i−1), Δt denotes the time which is taken to detect a position detection signal for a period of 60 degrees. However, due to the presence of mounting errors of the magnetic pole position detector the speed which is averaged over a period of 120° or more has been practically used.

The phase calculating unit 5 calculates the rotational phase θ* in accordance with the equation (4) using the detected position value θi and the rotational speed ω1* for controlling the reference phase of the motor 1.

$$\theta^* = \theta i + \omega i^* \cdot \Delta t \quad (4)$$

The basic configuration of the voltage control and the phase control in the open loop type vector control scheme has been described.

When a high torque is required during torque control operation, it is necessary to cause a high current corresponding to the torque to flow. When a high torque is required for an extended period of time, the resistance value R of the windings in the motor increases with the lapse of time due to heating of the motor caused by the current flowing through the motor. Since the preset resistance value R* which is calculated by the voltage vector operating unit 8 is not equal to the actual resistance value R, the motor 1 can not be supplied with a necessary voltage. As a result, a current which is necessary to generate a requisite torque can not flow, which leads to a shortage of the torque.

Hence, in the present embodiment, the currents Idc and Iqc of the d- and q-axes of the rotational coordinate system are estimated from the d. c. current IDC flowing through the input current bus line of the power converter. The signals ΔVd and ΔVq which depend on the current deviation are determined by the d- and q-axis current control units 9 and 10, respectively so that the estimated signals are equal to respective instruction values. The voltage output from the converter is changed by adding the signals ΔVd and ΔVq to the outputs of the voltage vector operating unit 8. As a result, even if the R* which is preset by the voltage vector operating unit 8 is not equal to the actual resistance value R, the output voltage can be controlled in such a manner that the currents in the motor are equal to the current instruction values. Thus, high precision torque control can be achieved with a simple configuration without causing a shortage of torque.

Although the voltage reference values Vd* and Vq* are calculated using instructed current values Id* and Iq* in the voltage vector operating unit 8, respectively in the present embodiment, similar advantage can be provided by using Idc and Iqc which are estimated from the d. c. current IDC.

Second Embodiment

Figure 2:
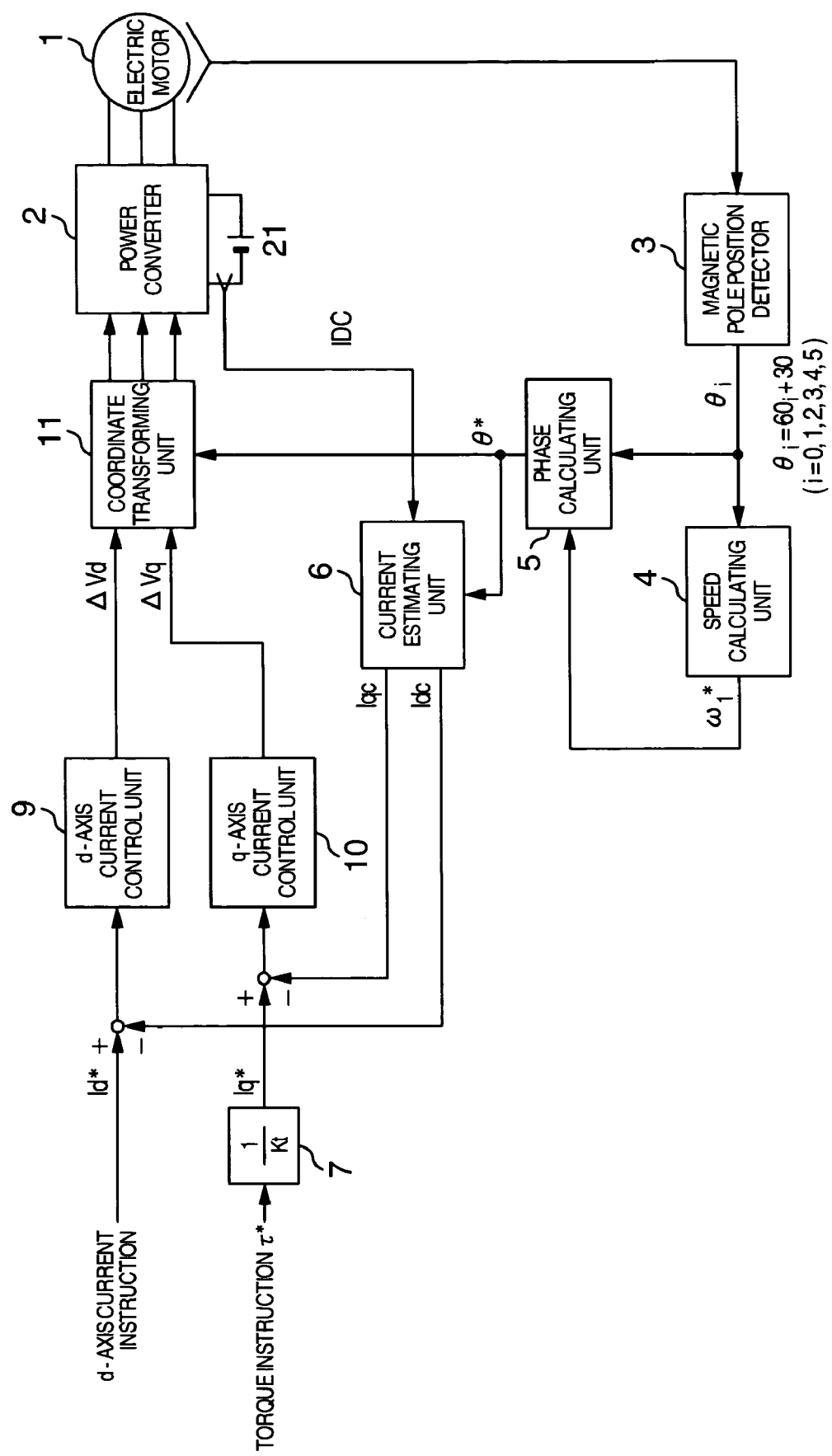
FIG. 2 shows the configuration of a torque control circuit of a permanent magnet synchronization motor of another embodiment of the present invention.

Referring now to FIG. 2, there is shown another embodiment of the present invention, which is an apparatus for controlling the torque of the permanent magnetic synchronization motor in which the voltages output from the converter are controlled by controlling only the currents on the d- and q-axis without conducting the operation of the output voltage vector.

Components in FIG. 2 which are identical with those in FIG. 1 are represented by reference numerals 1 through 7, 9 through 11, and 21. The difference between the embodiments in FIGS. 1 and 2 resides in that the voltage vector operating unit 8 is omitted. Even if the voltage vector operating unit 8 is omitted, the voltages output from the converter can be controlled by the current control units 9 and 10 in such a manner that Idc and Iqc are equal to respective instructing values. Thus, high precision torque control can be achieved with a simple configuration without causing a shortage of torque.

Third Embodiment

Figure 3:
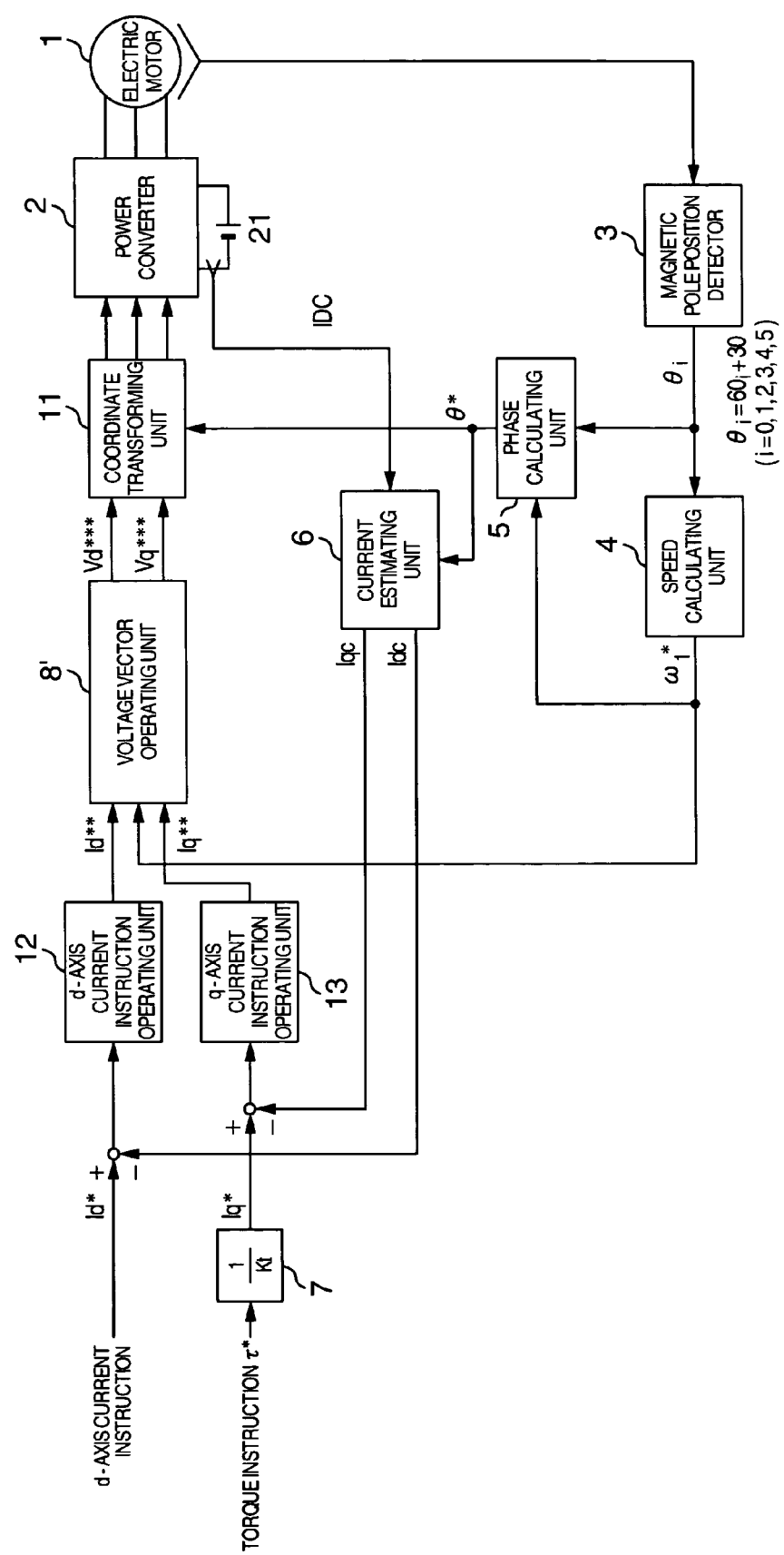
FIG. 3 shows the configuration of a torque control circuit of a permanent magnet synchronization motor of a further embodiment of the present invention.

Referring now to FIG. 3, there is shown a further embodiment of the present invention, which is an apparatus for controlling the torque of a permanent magnet synchronization motor of the type in which the instruction values Id and Iq are obtained from the outputs of the d- and q-axis current instruction calculating units 12, 13. Components in FIG. 3 which are identical with those in FIG. 1 are designated with reference numerals 1 to 7, 11 and 21. A reference numeral 8' denotes a voltage vector operating unit for operating voltage reference values Vd* and Vq* based upon constants of the motor, signals Id and Iq, respectively and the rotational speed ω1*. A reference numeral 12 denotes a d-axis current instruction calculating unit for outputting the Id** as a function of the deviation between Id* and Idc. A reference numeral 13 denotes a q-axis current instruction operating unit for outputting Iq** as a function of the difference between Iq* and Iqc. The output voltages of the converter are controlled by calculating the voltage reference values Vd* and Vq* represented in the equation (5) using the signals Id and Iq, respectively.

$$\begin{pmatrix} Vd^{***} = R_1^* \cdot Id^{**} - \omega_1^* \cdot Lq^* \cdot Iq^{} \\ Vq^{*} = R_1^* \cdot Iq^{**} + \omega_1^* \cdot Ld^* \cdot Id^{**} + \omega_1^* \cdot Ke^* \end{pmatrix} \quad (5)$$

It is apparent that the present embodiment operates similarly to the foregoing embodiments and similar advantages can be provided if considering that id* and Iq* are equal to Idc and Iqc, respectively even in such a scheme.

Fourth Embodiment

In the first to third embodiments, interpolation of the phase signals θ* is conducted by using the rotational speed ω1* based upon the position values θi which are detected by the magnetic pole position detector 3. It is necessary to conduct a speed averaging processing in the intermediate and high speed range since there are variations in detected position signals and the like due to the mounting error of the Hall effect element. This calculation lag invites the necessity of high response. Hence, high response can be achieved by controlling the torque control apparatus in a position sensorless manner to eliminate the influences of variations in the detected position signal.

Figure 4:
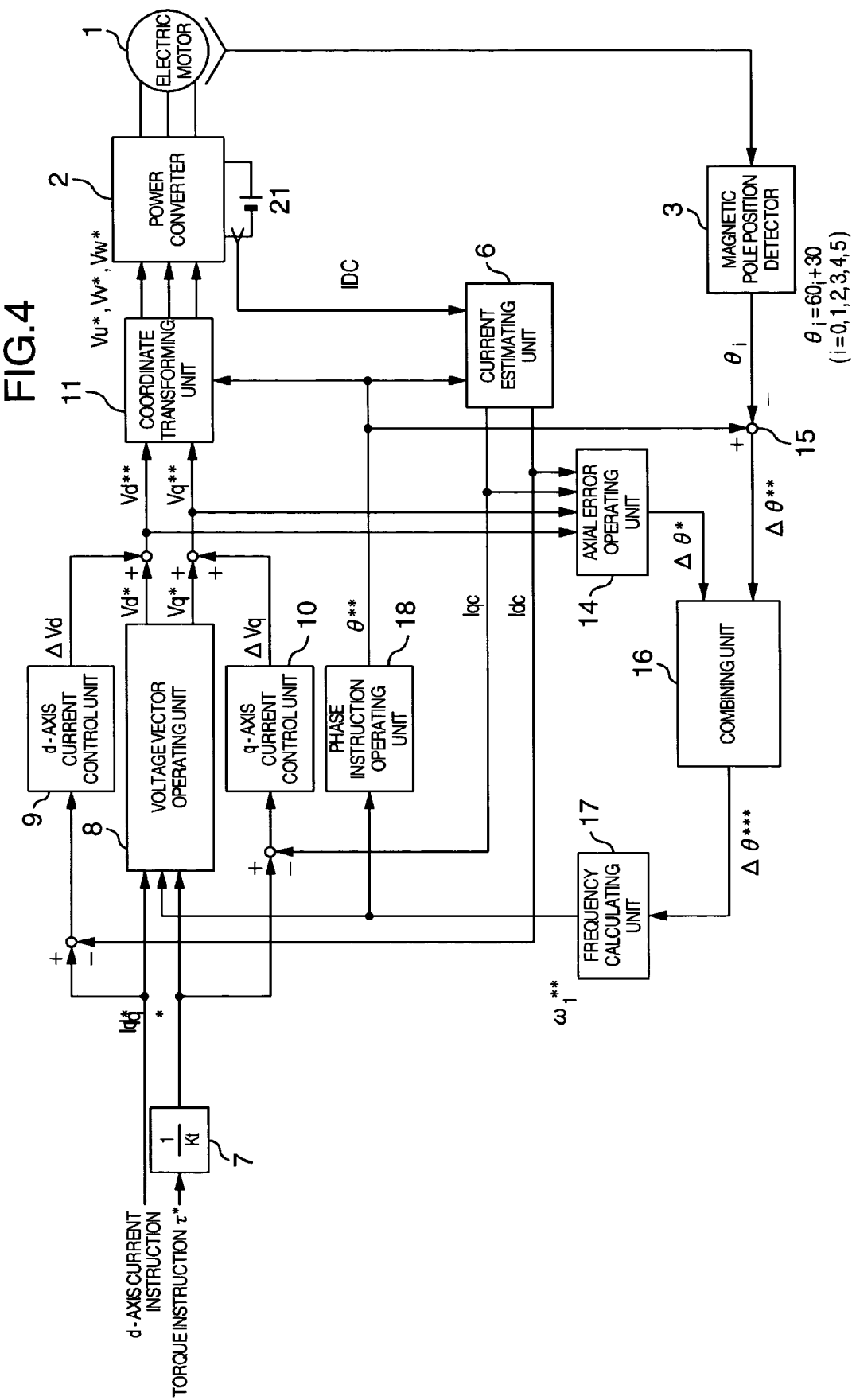
FIG. 4 shows the configuration of a torque control circuit of a permanent magnet synchronization motor of a further embodiment of the present invention.

Referring now to FIG. 4, there is shown an exemplary configuration of the fourth embodiment. Components in FIG. 4 which are identical with those in FIG. 4 are represented with reference numerals 1, 2, 3, 6, 7 to 11, 21. The difference between the embodiments of FIGS. 1 and 4 resides in that the fourth embodiments comprises an axial error operating unit 14 which estimates a first phase error Δθ* which is the difference between the rotational phase instruction θ and the actual rotor phase θ, based upon the voltage instruction values Vd and Vq and the estimated current values Idc and Iqc; a subtractor which determines a second phase error Δθ which is the difference between the detected position values θi (i=0, 1, 2, 3, 4, 5) output from the magnetic pole position detector 3 and the rotational instruction phase θ; a combining unit 16 which determines a third phase error Δθ* from the first and second phase errors Δθ* and Δθ; a frequency calculating unit 17 which calculates a frequency instruction ω1 for the converter using the third phase error Δθ*; and a phase instruction operating unit 18 which determines a rotational phase instruction θ by integrating the signal ω1**.

The axial error operating unit 14 calculates the first phase error Δθ*(=θ−θ) which is the difference between the actual rotor phase θ and the rotation phase instruction θ in accordance with the equation (6).

$$\Delta\theta^* = \tan^{-1}\left(\frac{Vd^{**} - R_1^* \cdot Id_c + \omega_1^{**} \cdot Lq^* \cdot Iq_c}{Vq^{**} - R_1^* \cdot Iq_c + \omega_1^{**} \cdot Lq^* \cdot Id_c}\right) \quad (6)$$

This equation is used for the positional error calculation of the position sensorless operating method which is disclosed in JP-A 2001-251889.

The combining unit 16 calculates the third phase error Δθ*** by using the above-mentioned first and second phase errors Δθ* and Δ74 **, respectively, in accordance with one of three approaches as follows:

A first approach selects a value which is the sum of the first and second phase errors Δθ* and Δθ** or an average value thereof. A second approach selects larger one of the absolute values of the first and second phase errors Δθ* and Δθ**. A third approach selects less one of the absolute values of the first and second phase errors Δθ* and Δθ** and is used when the variations in the mounting position of the position detector are larger.

Figure 5:
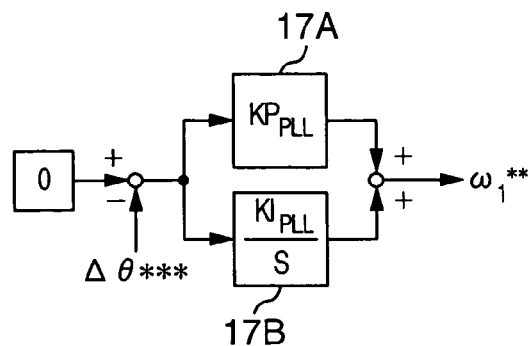
FIG. 5 shows a frequency operating unit in the apparatus of FIG. 4.

Now, the frequency calculating unit 17 will be described with reference to FIG. 5. In this unit 17, the third axial error Δθ* which is an output of the combining unit 16 is compared with zero. The resultant deviation is multiplied by a proportional gain KPPLL in a proportional operating unit 17A. The deviation is multiplied by an integration gain KIPLL for conducting an integration processing in an integration operating unit 17B. The output of the proportional operating unit 17A is added with the output of the integration operating unit 17B to calculate the frequency instruction ω1 for the converter.

In the phase instruction operating unit 18, the frequency instruction ω1 is integrated as shown in equation (7) to calculate the phase instruction θ. The phase of the output of the power converter 2 is controlled in accordance with θ** via the coordinate converting unit 11.

$$\theta^{} = \int \omega_1^{} dt \quad (7)$$

Use of two pieces of information on the position detection signal and the phase error which is estimated from the voltage and current eliminates the necessity of the speed averaging processing to compensate for the variations in the position detection signal, enabling a high response torque control system to be achieved.

Although control and operation is conducted in the axial error operating unit 14 and the d- and q-axis current control units 9 and 10 using Idc and Iqc which are estimated from the d. c. current IDC in the fourth embodiment, similar effects can be obtained even using the d- and q-axis current values which are calculated from the detected a. c. current values and the rotational phase instruction of the motor in the motor current detecting unit.

Fifth Embodiment

In the fourth embodiment, the second axial error $\Delta\theta^{}$ is determined from the detected position value $\theta i$ (i=0, 1, 2, 3, 4, 5) which are information on actual position output from the magnetic pole position detector 3 and the rotational phase instruction $\theta^{}$. Since the position can be detected at only 6 phases and is liable to be influenced by the mounting error of the magnetic pole position detector 3 in the fourth embodiment, in order to avoid this problem the rotational phase $\theta^*$ which is shown in FIGS. 1 to 3 is used, so that the axial error is determined from this rotational phase and the rotational phase instruction $\theta^{**}$ in the fifth embodiment.

Now, the exemplary fifth embodiment will be described with reference to FIG. 6. Components which are identical with those in the foregoing embodiments will be designated with the same reference numerals.

The rotational speed $\omega1^*$ is calculated from the detected position value $\theta i$ in accordance with equation (3) in the speed calculating unit 4. The rotational phase $\theta^*$ is calculated from the detected position value $\theta i$ and the rotational speed $\omega1^*$ in accordance with equation (4) in the phase calculating unit 5. The difference between the phase instruction $\theta^{**}$ and the above-mentioned phase $\theta^*$ is determined as the second phase error by using the subtracting unit 15. A reference numeral 16 denotes an adding unit which is used in the above-mentioned first approach in FIG. 6. The adding unit 16 corresponds to the combining unit shown in the fourth embodiment.

are preset in the voltage vector operating unit 8 and the axial error operating unit 14 and the actual motor constants exist in the control configuration of FIG. 6 will be considered.

Firstly, a case in which the second phase error $\Delta\theta^{}$ is not added to the adding unit 16 which is the combining unit will be considered. The frequency instruction $\omega1^{}$ is calculated with the calculated first phase error $\Delta\theta^*$ which is calculated in the axial error operating unit 14. The d- and q-axis voltage instructions $Vd^{}$, $Vq^{}$ are calculated as shown in equation (8) in the voltage vector calculating unit 8.

$$\begin{bmatrix} Vd^{} \\ Vq^{} \end{bmatrix} = \begin{bmatrix} R_1^* & -\omega_1^{**} \cdot Lq^* \\ \omega_1^{**} \cdot Ld^* & R_1^* \end{bmatrix} \cdot \begin{bmatrix} Id^* \\ Iq^* \end{bmatrix} + \begin{bmatrix} \Delta V_d \\ \omega_1^{**} \cdot Ke^* + \Delta V_q \end{bmatrix} \quad (8)$$

If the phase error $\Delta\theta$ which is the difference between a signal $\theta$ of "control reference axis" and a signal $\theta^*$ of "magnetic flux axis of the motor" occurs due to the preset errors of motor constants.

Coordinate transformation matrix from the control axis (dc–qc) to the real axis (d–q) is expressed as equation (9).

$$\begin{bmatrix} d \\ q \end{bmatrix} = \begin{bmatrix} \cos\Delta\theta & -\sin\Delta\theta \\ \sin\Delta\theta & \cos\Delta\theta \end{bmatrix} \cdot \begin{bmatrix} d_c \\ q_c \end{bmatrix} \quad (9)$$

If $\Delta\theta$ occurs, the voltages Vd, Vq on the d- and q-axes which are generated on the control side and are applied to the motor are expressed as equation (10) by equations (8) and (9) using preset values of the motor constants.

$$\begin{bmatrix} Vd \\ Vq \end{bmatrix} = \begin{bmatrix} \cos\Delta\theta & -\sin\Delta\theta \\ \sin\Delta\theta & \cos\Delta\theta \end{bmatrix} \cdot \left\{ \begin{bmatrix} R_1^* & -\omega_1^{**} \cdot Lq^* \\ \omega_1^{**} \cdot Ld^* & R_1^* \end{bmatrix} \cdot \begin{bmatrix} Idc \\ Iqc \end{bmatrix} + \begin{bmatrix} \Delta V_d \\ \omega_1^{**} \cdot Ke^* + \Delta V_q \end{bmatrix} \right\} \quad (10)$$

$$= \begin{bmatrix} \cos\Delta\theta \cdot (R_1^* Idc - \omega_1^{**} \cdot Lq^* \cdot Iqc + \Delta V_d) - \sin\Delta\theta \cdot \\ \sin\Delta\theta \cdot (R_1^* Idc - \omega_1^{**} \cdot Lq^* \cdot Iqc + \Delta V_d) + \cos\Delta\theta \cdot \\ (R_1^* \cdot Iqc + \omega_1^{**} \cdot Ld^* \cdot Idc + \omega_1^{**} \cdot Ke^* + \Delta V_q)] \\ (R_1^* \cdot Iqc + \omega_1^{**} \cdot Ld^* \cdot Idc + \omega_1^{**} \cdot Ke^* + \Delta V_q)] \end{bmatrix}$$

On the other hand, the voltages Vd and Vq on the d- and q-axes which are applied to the motor can be expressed as equation (11) using motor constants.

$$\begin{bmatrix} Vd \\ Vq \end{bmatrix} = \begin{bmatrix} R_1 & -\omega_1 \cdot Lq \\ \omega_1 \cdot Ld & R_1^* \end{bmatrix} \cdot \begin{bmatrix} Id \\ Iq \end{bmatrix} \cdot \begin{bmatrix} 0 \\ \omega_1 \cdot Ke \end{bmatrix} \quad (11)$$

$$= \begin{bmatrix} R_1 & -\omega_1 \cdot Lq \\ \omega_1 \cdot Ld & R_1 \end{bmatrix} \cdot \begin{bmatrix} \cos\Delta\theta & -\sin\Delta\theta \\ \sin\Delta\theta & \cos\Delta\theta \end{bmatrix} \cdot \begin{bmatrix} Idc \\ Iqc \end{bmatrix} + \begin{bmatrix} 0 \\ \omega_1 \cdot Ke \end{bmatrix}$$

$$= \begin{bmatrix} \cos\Delta\theta \cdot (R_1 \cdot Idc - \omega_1 \cdot Lq \cdot Iqc) - \sin\Delta\theta \cdot (R_1 \cdot Iqc + \omega_1 \cdot Lq \cdot Idc) \\ \sin\Delta\theta \cdot (R_1 \cdot Idc - \omega_1 \cdot Lq \cdot Iqc) + \cos\Delta\theta \cdot (R_1 \cdot Iqc + \omega_1 \cdot Lq \cdot Idc) + \omega_1 \cdot Ke \end{bmatrix}$$

Now, operation and effect of the fifth embodiment will be described. A case in which errors between constants which When current control is conducted by presetting the relationship that the right clause of equation (10) equals the right clause of equation (11), Id* and Iq* to be zero and a predetermined value, respectively, the values ΔVd and ΔVq output from the d- and q-axis current control units 9, 10 can be expressed by equations (12) and (13), respectively.

$$\Delta Vd = \omega_1^{**} \cdot [(Lq^* - Lq) - \sin^2 \Delta\theta \cdot (Ld - Lq)] \cdot Iq^* + \sin\Delta\theta \cdot \omega_1^{**} \cdot Ke \quad (12)$$

$$\Delta Vq = -(R_1^* - R_1) \cdot Iq^* - \omega_1^{**} \cdot Ke^* + \frac{1}{\cos\Delta\theta} \cdot \omega_1^{**} \cdot Ke$$
$$-\tan\Delta\theta \cdot [\cos^2\Delta\theta \cdot \omega_1^{**} \cdot (Ld - Lq) \cdot Iq^* + \sin\Delta\theta \cdot \omega_1^{**} \cdot Ke] \quad (13)$$

Equation (14) can be obtained by substituting equation (8) into the first phase error Δθ* which is calculated in accordance with equation (6) in the axial error operating unit 14.

$$\Delta\theta^* = \tan^{-1}\left(\frac{R_1^* \cdot Id^* - \omega_1^{**} \cdot Lq^* \cdot Iq^* + \Delta Vd - R_1^* \cdot Id_c + \omega_1^{**} \cdot Lq^* \cdot Iqc}{R_1^* \cdot Iq^* + \omega_1^{**} \cdot Ld^* \cdot Id^* + \omega_1^{**} \cdot Ke^* + \Delta Vq - R_1^* \cdot Iq_c - \omega_1^{**} \cdot Lq^* \cdot Iqc}\right) \quad (14)$$

Since the relationships Iq*=Iqc, Id*=Idc=0 are established by the action of the current control unit, Δθ* can be expressed by equation (15).

$$\Delta\theta^* = \tan^{-1}\left(\frac{\Delta Vd}{\omega_1^{**} \cdot Ke^* + \Delta Vq}\right) \quad (15)$$

The first phase error Δθ* can be expressed by equation (16) when the outputs of the current control unit ΔVd, ΔVq which are expressed by equations (12) and (13), respectively are substituted into equation (15).

$$\Delta\theta^* = \tan^{-1}\left(\frac{\omega_1^{**} \cdot ([(Lq^* - Lq) - \sin^2\Delta\theta \cdot (Ld - Lq)] \cdot Iq^* + \sin\Delta\theta \cdot Ke)}{-(R_1^* - R_1) \cdot Iq^* \cdot \omega_1^{**} \cdot \left(\frac{1}{\cos\Delta\theta}\right) \cdot Ke - \tan\Delta\theta \cdot [\cos^2\Delta\theta \cdot (Ld - Lq) \cdot Iq^* + \sin\Delta\theta \cdot Ke]}\right) \quad (16)$$

If the second phase error Δθ is not added to the adding unit 16**, the first phase error Δθ* which is expressed by equation (16) is compared with zero. As a result of PI (proportional and integral) operation with the deviation signal which is obtained by the comparison, Δθ* becomes zero at a constant speed. In other words, a numerator component of equation (16) has a relationship of equation (17) at a constant speed.

$$-\sin^2\Delta\theta \cdot (Ld - Lq) \cdot Iq^* + \sin\Delta\theta \cdot Ke + (Lq^* - Lq) \cdot Iq^* = 0 \quad (17)$$

When the phase error Δθ which occurs at a constant speed is determined from equation (17), equation (18) is obtained.

$$\Delta\theta = \sin^{-1}\left(\frac{Ke - \sqrt{Ke^2 + 4 \cdot Iq^{*2} \cdot (Ld - Lq) \cdot (Lq^* - Lq)}}{2 \cdot Iq^* \cdot (Ld - Lq)}\right) \quad (18)$$

It is found from equation (18) that the magnitude of the phase error Δθ is related with the preset error of the q-axis inductance (Lq*−Lq).

Now, motor torque equation is derived if the phase error Δθ is present.

The torque of the motor on d- and q-axes is expressed by equation (19).

$$\tau_m = \frac{3}{2} \cdot P_m \cdot (Ke \cdot Iq + (L_d - L_q) - Id \cdot Iq) \quad (19)$$

Pm denotes the number of pairs of poles of the motor.

Equation (20) can be obtained when current control is conducted by presetting Id* to "zero" in consideration of a coordinate transformation matrix from control axis (dc−qc) to real axis (d−q).

$$\tau_m = \frac{3}{2} \cdot P_m \cdot (\cos\Delta\theta \cdot Iq_c \cdot [Ke - (L_d - L_q) \cdot \sin\Delta\theta \cdot Iq_c]) \quad (20)$$

It is found from equation (20) that a component "cos Δ·Iqc·Ke" decreases so that τm decreases toward "zero" even if the esstimated q-axis current value Iqc is generated according to the instructed value when the phase error Δθ approaches to ±π/2[rad].

In other words, there is a relationship that the preset error of Lq* causes the phase error Δθ to decrease the motor torque τm.

Hence, if the second phase error Δθ is added to the adding unit 16** which is a combining unit, it is used as a suggestion signal for modifying the first phase error Δθ* in the present embodiment shown in FIG. 6.

The second phase error Δθ (equivalent to phase error Δθ) which is the difference between the "control reference axis" signal θ and "motor flux axis" signal θ* is determined in the subtracting unit 15 as represented by equation (21).

$$\Delta\theta^{} = \theta^{} - \theta^* \quad (21)$$

The third phase error Δθ* is calculated as represented in equation (22) by adding the second phase error Δθ into the first phase error Δθ* in the adding unit 16.

$$\Delta\theta^{***} = \Delta\theta^* + \theta^{**} \quad (22)$$

The reference axis for vector control is correctly changed (aligned with the magnetic flux axis of the motor) by calculating the frequency instruction ω1 of the converter with this third phase error Δθ* and by determining the rotational phase instruction θ from the signal ω1. High precision control of torque which is proportional to the q-axis current value Iq as represented by equation (19) can be achieved.

Sixth Embodiment

The second phase error Δθ is adopted as the suggestion signal for modifying the reference axis of vector control in the fifth embodiment whereas preset error ΔLq^ of the q-axis inductance which is used as preset constants of the voltage vector calculating unit 8'', axial error calculating unit 14', and q-axis current control unit 10 is calculated using the second phase error $\Delta\theta^{}$, so that automatic presetting of q-axis inductance is conducted by using the calculated preset error $\Delta Lq\hat{}$.

Referring now to FIG. 7, there is exemplarily shown the configuration of the present embodiment. Components which are identical with those in FIG. 6 are designated with reference numerals 1 to 7, 9, 11, 15 to 18 and 21. The q-axis inductance operating unit 19 estimates the q-axis inductance present error $\Delta Lq\hat{}$ (=Lq*−Lq) from the third phase error $\Delta\theta^{}$. The voltage vector operating unit 8''** calculates voltage reference values Vd* and Vq* based upon motor constants, current instruction values Id*, Iq*, frequency instruction $\omega 1^{}$ and the q-axis inductance present error $\Delta Lq\hat{}$. The q-axis current control unit 10' modifies the current control gain based upon the q-axis inductance preset value $\Delta Lq\hat{}$. The axial error operating unit 14'** calculates the first phase error $\Delta\theta^{*}$ based upon the voltage instruction values Vd, Vq, estimated current values Idc, Iqc and the q-axis inductance preset value $\Delta Lq\hat{}$.

Now, operation and effect of the present invention will be described.

As mentioned above, the equation (17) is established at a constant speed in the frequency calculating unit 17. Equation (23) can be obtained by changing equation (17).

$$Iq^{*}\cdot(\cos^{2}\Delta\theta\cdot(Lq^{*}-Lq)-\sin^{2}\Delta\theta\cdot(Ld-Lq^{*}))+\sin\Delta\theta\cdot Ke=0 \quad (23)$$

$\Delta Lq$ (Lq*−Lq) is determined by the following equation (24).

$$\Delta Lq = -\frac{\tan\Delta\theta\cdot Ke}{\cos\Delta\cdot\theta Iq^{*}} + \tan^{2}\Delta\theta\cdot(Ld-Lq^{*}) \quad (24)$$

$\Delta Lq\hat{}$ which is the estimated value of $\Delta Lq$ can be determined by using Ld* in lieu of Ld on operation of equation (25).

Assuming Ld=Ld* does not matter since Ld is less influenced by current saturation.

$$\Delta Lq\hat{} = -\frac{\tan\Delta\theta\cdot Ke^{*}}{\cos\Delta\cdot\theta Iq^{*}} + \tan^{2}\Delta\theta\cdot(Ld^{*}-Lq^{*}) \quad (25)$$

A mark * denotes a preset value or instruction value.

Figure 8:
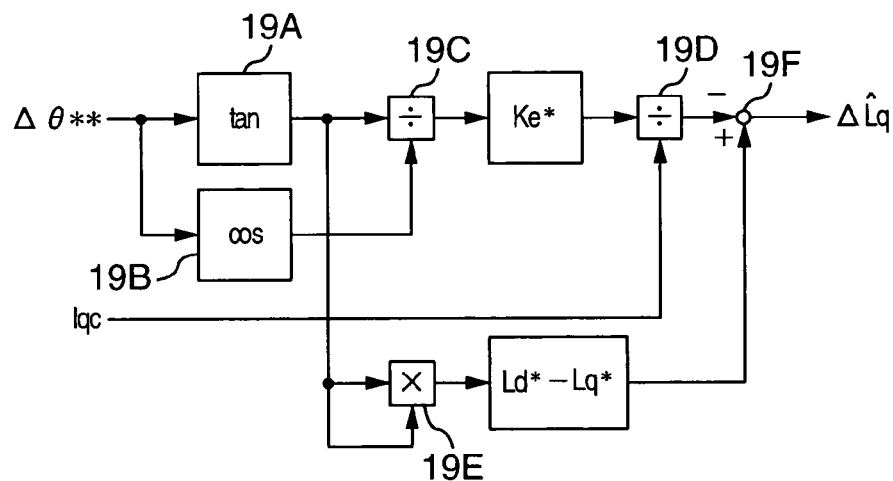
FIG. 8 shows a q-axis inductance operating unit in the apparatus of FIG. 7.

Now, an example of the q-axis inductance operation unit 19 which conducts the operation expressed by equation (25) will be described with reference to FIG. 8. The second phase error $\Delta\theta^{}$ is input to a function generating unit 19A which calculates tan ($\Delta\theta^{}$) and a function generating unit 19B which calculates cos ($\Delta\theta^{}$) and the outputs of the function generating units 19A and 19B are then input to a dividing unit 19C where the dividing operation is conducted. The output of the dividing unit 19C** is multiplied by an induced electromotive voltage constant Ke*. Its product is input to the dividing unit 19D together with the estimated q-axis current value. Iqc is used in lieu of Iq* which is represented in equation (26).

The output tan ($\Delta\theta^{}$) of the function generating unit 19A is input to the multiplier 19E where it is squared. The square of the output of the multiplier 19A** is multiplied by the difference (Ld*−Lq*) between the d-axis inductance preset value Ld* and d-axis inductance preset value Ld*. Its product is input to the subtracting unit 19F together with the output of the dividing unit 19D. The output of the subtracting unit 19F becomes the q-axis inductance present error $\Delta Lq\hat{}$.

If the motor has a relationship Ld≈Lq* (salient pole is small), equation (25) can be simplified into equation (26).

$$\Delta Lq\hat{} = -\frac{\tan\Delta\theta\cdot Ke^{*}}{\cos\Delta\cdot\theta Iq^{*}} \quad (26)$$

Now, a method of reflecting the q-axis inductance preset error $\Delta Lq\hat{}$ which has been thus determined on the control system will be described.

Operation of equation (27) is conducted using a signal $\Delta Lq\hat{}$ in the voltage vector operating unit 8''.

$$\begin{bmatrix} Vd^{*} \\ Vq^{*} \end{bmatrix} = \begin{bmatrix} RI^{*} & -\omega_{1}^{}\cdot(Lq-\Delta Lq\hat{}) \\ \omega_{1}^{}\cdot Ld^{*} & RI^{*} \end{bmatrix} \cdot \begin{bmatrix} Id^{*} \\ Iq^{*} \end{bmatrix} + \begin{bmatrix} 0 \\ \omega_{1}^{**}\cdot Ke^{*} \end{bmatrix} \quad (27)$$

Similarly, operation of the equation (28) is also conducted using the q-axis inductance preset error $\Delta Lq\hat{}$ in the axial error operating unit 14'.

$$\Delta\theta^{*} = \tan^{-1}\left(\frac{Vd^{**}-R^{*}\cdot Id_{c}+\omega_{1}^{**}\cdot(Lq^{*}-\Delta Lq\hat{})\cdot Iq_{c}}{Vq^{**}-R^{*}\cdot Iq_{c}-\omega_{1}^{**}\cdot(Lq^{*}-\Delta Lq\hat{})\cdot Id_{c}}\right) \quad (28)$$

By modifying the preset q-axis inductances which are represented by equations (27) and (28), the modification of Lq* makes the phase error $\Delta\theta$ zero so that the motor torque τm which is the same as instructed value can be generated. High precision position sensorless control can be achieved.

Figure 9:
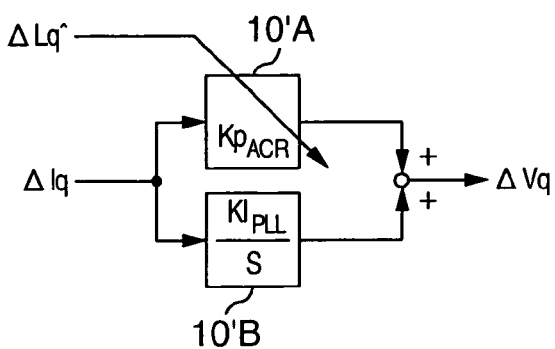
FIG. 9 shows a q-axis current control unit in the apparatus of FIG. 7.

The proportional gain of the q-axis current control unit 10' can also be changed by using the signal $\Delta Lq\hat{}$. The configuration of the q-axis current control unit 10' is exemplarily illustrated in FIG. 9.

The differential signal between the signal Iq* and the signal Iqc is input to the proportional operating unit 10'A together with the q-axis inductance preset error $\Delta Lq\hat{}$. The proportional operating unit 10'A calculates the proportional gain $KP_{ACR}$ in accordance with equation (29) using the q-axis inductance preset error $\Delta Lq\hat{}$. The calculated gain $KP_{ACR}$ is multiplied by the differential signal $\Delta Iq$ to provide an output signal.

$$KP_{ACR} = \omega c \cdot (Lq^{*}-\Delta Lq\hat{}) \quad (29)$$
$$= \omega c \cdot Lq$$

wherein $\omega c$ denotes the closed loop response frequency of the current control system (rad/s).

The integration operation unit 10'B conducts an integration by multiplying the signal $\Delta Iq$ by the integration gain $KP_{ACR}$. The output of the integration operation unit 10'B is added with the output of the proportional operating unit 10'A for providing a signal $\Delta Vq$ which is used for changing the output voltage of the converter.

High torque response as is preset can be obtained by calculating the proportional gain $KP_{ACR}$ based upon the q-axis inductance preset error $\Delta Lq\hat{}$ even if there is a preset error in the q-axis inductance.

Control gain of the q-axis current control unit is changed based upon the q-axis inductance preset error $\Delta Lq\hat{}$ in the present embodiment. Similar effect can be obtained even by applying the present invention to the changing of control gain of the q-axis current instruction operating unit.

Seventh Embodiment

In the former embodiment, the third phase error $\Delta\theta$* is obtained by adding the second phase error $\Delta\theta$ with the first phase error $\Delta\theta$*. Alternatively, the q-axis inductance preset error $\Delta Lq\hat{}$ can be calculated from the second phase error $\Delta\theta$ even by making the third phase error $\Delta\theta$* equal to the first phase error $\Delta\theta$* without adding the second phase error $\Delta\theta$***. It is obvious that an effect which is similar to that of the former embodiment can be obtained.

Figure 10:
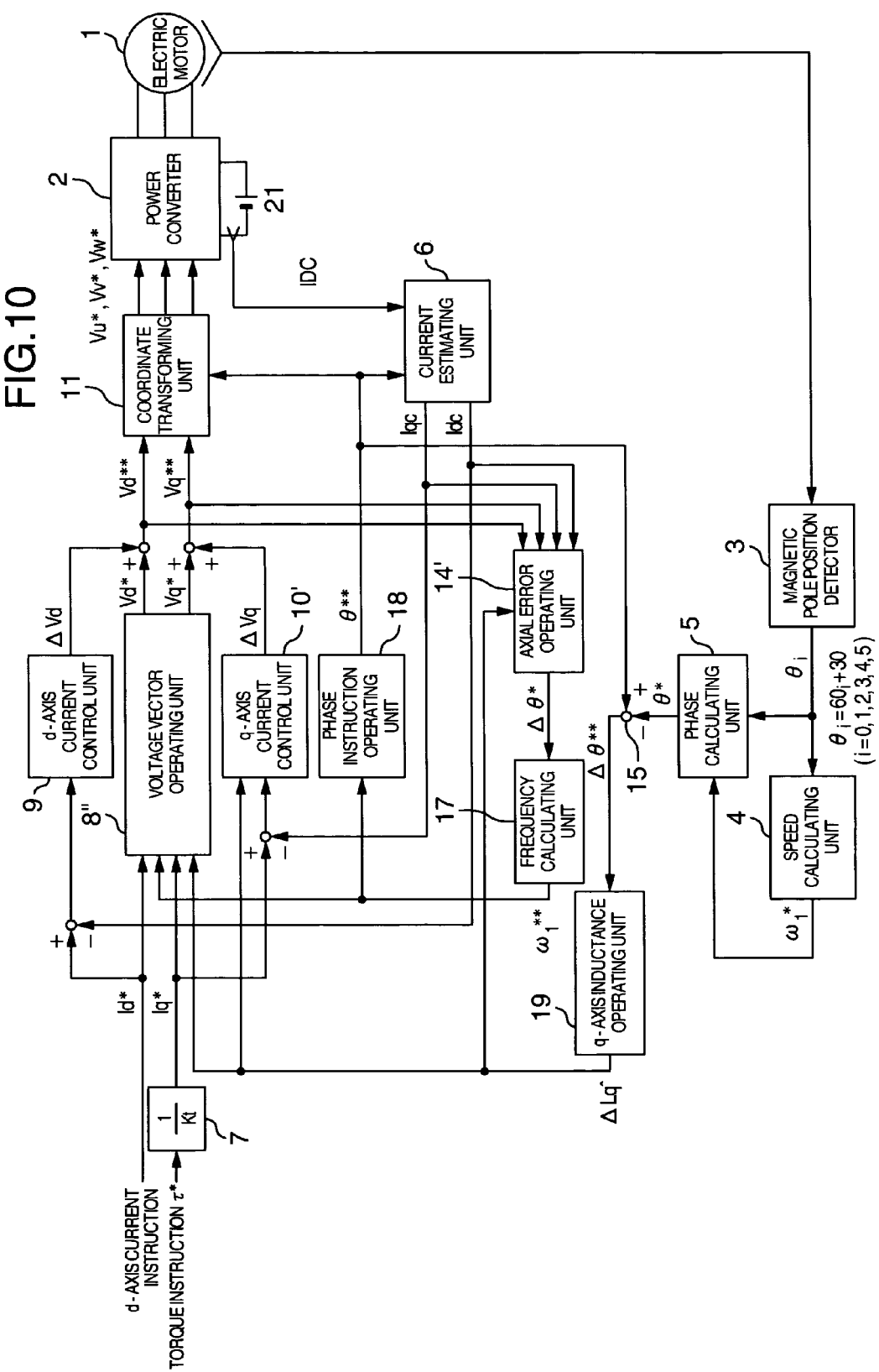
FIG. 10 shows the configuration of the torque control circuit of the permanent magnet synchronization motor of a further embodiment of the present invention.

The configuration of the seventh embodiment is exemplarily illustrated in FIG. 10. The present embodiment is substantially identical with that shown in FIG. 7 except that the first phase error $\Delta\theta$ which is an output of the axial error operating unit 14 is directly input to the frequency calculating unit 17.

Further description will be omitted since operation and effect of the present embodiment is identical with that of the former embodiment.

Eighth Embodiment

Figure 11:
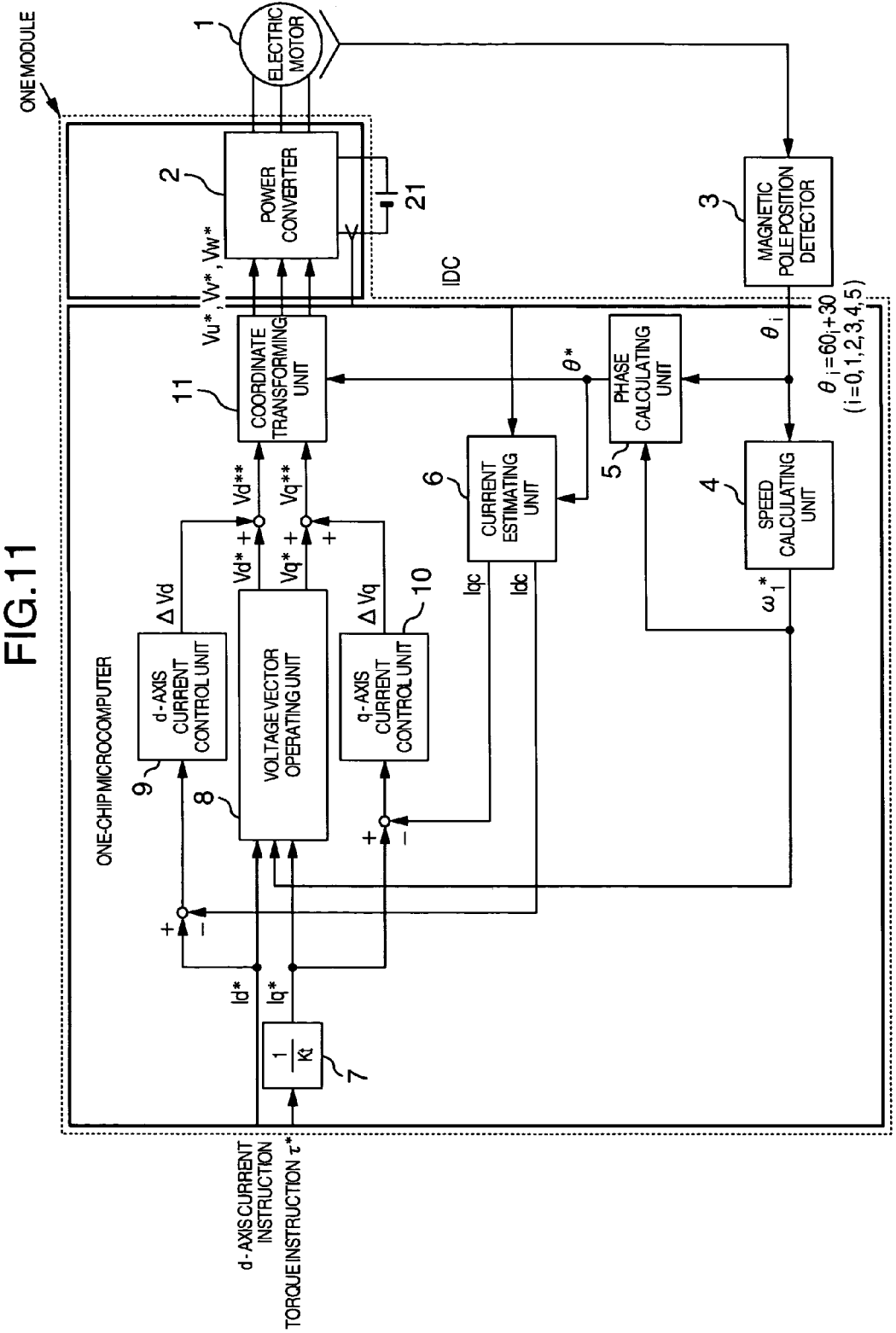
FIG. 11 shows an example to which the present invention is applied.

An example in which the present invention is applied to a module will be described with reference to FIG. 11. The present embodiment is an example of the first embodiment. A speed calculating unit 4, phase calculating unit 5, current estimating unit 6, constant 7, voltage vector operating unit 8, d-axis current control unit 9, q-axis current control unit 10, and coordinate transforming unit 11 are formed of a one-chip microcomputer. The one-chip microcomputer and power converter are accommodated in one module formed on one and same board. A term "module" used herein means a standardized component which may be formed of separable hardware/software elements. The module is preferably formed on one and same board for ease of manufacturing, but is not limited thereto. The module may be formed on a plurality of circuit boards which are disposed in one and same housing.

The module may take similar form in the other embodiments.

Ninth Embodiment

Figure 12:
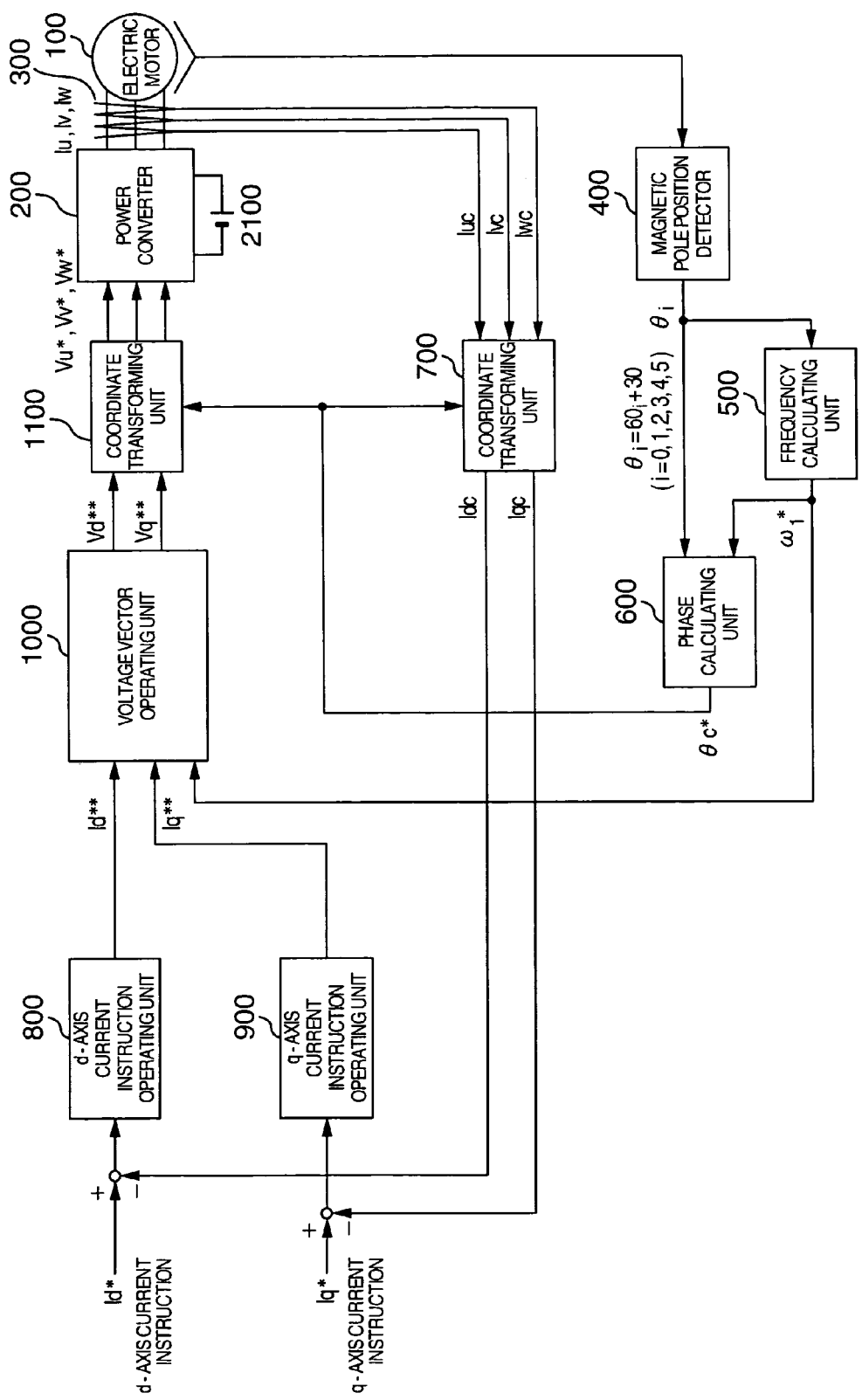
FIG. 12 shows an apparatus for controlling the permanent magnet synchronization motor of one embodiment of the present invention.

FIG. 12 shows the configuration of control system of a permanent magnet synchronization motor which is one of a. c. motors of one embodiment of the present invention.

A reference numeral 100 denotes a permanent magnet synchronization motor; 2100 denotes a d. c. power source; 2000 denotes outputs from the output of a d. c. power source; 2100 denotes voltages which are proportional to three-phase a. c. voltage instruction values Vu*, Vv*, Vw*; 3000 denotes a current detector which is capable of detecting three-phase currents Iu, Iv, Iw; 4000 denotes a magnetic pole position detector which is capable of detecting the position detection value θi at every 60° of electrical angle of the motor; 5000 denotes a phase calculating unit for calculating the rotational phase instruction θc* of the motor from the position detection value θi and the frequency instruction value ω1*; 7000 denotes a power converting unit for outputting d- and q-axis current detection values Idc, Iqc from the detected values Iuc, Ivc, Iwc of the three-phase alternating currents Iu, Iv, Iw and the rotational phase instruction θc*; 8000 denotes a d-axis current instruction operating unit for outputting a second d-axis current instruction value Id** depending upon the difference between the first d-axis current instruction value Id* and d-axis current detection value Idc; 9000 denotes a q-axis current instruction operating unit for outputting a second q-axis current instruction value Iq** depending upon the difference between the first q-axis current instruction value Iq* and the q-axis current detection value Iqc; 1000 denotes a voltage vector operating unit for operating voltage instruction values Vd, Vg based upon motor constants, second current instruction values Id, Iq and frequency instruction value ω1*; and 1100 denotes a coordinate transforming unit for outputting three-phase voltage instruction values Vu*, Vv*, Vw* from the voltage instruction values Vd, Vq and the rotational phase instruction θc*.

Firstly, the basic operation of the d-axis current instruction operating unit 800 and the q-axis current instruction operating unit 900 which is one of features of the present invention will be described.

The d-axis and q-axis current detection values Idc, Iqc are calculated from the three-phase a. c. values Iuc, Ivc, Iwc which are detected by the current detector 300 and the rotational phase instruction θc* in the coordinate transforming unit 700. The second d-axis and q-axis current instruction values Id, Iq are calculated in the d- and q-axis current instruction calculating units 800, 900, respectively, so that the current detection values Idc, Iqc are equal to the first d-axis and q-axis current instruction values Id*, Iq* which are provided from host apparatus.

The voltage vector operating unit 1000 calculates voltage instruction values Vd, Vq by using calculated current instruction values Id, Iq and motor constants as represented by equation (100) for controlling the output voltage from the converter.

$$\begin{pmatrix} Vd^* = R_1^* \cdot Id^* - \omega_1^* \cdot Lq^* \cdot Iq^* \\ Vq^* = R_1^* \cdot Iq^* - \omega_1^* \cdot Ld^* \cdot Id^* + \omega_1^* \cdot Ke^* \end{pmatrix} \quad (100)$$

In equation (100), R1* denotes preset value of the resistance of the motor; Ld* denotes preset value of the d-axis inductance; Ke* denotes preset value of the induced voltage constant; ω1* denotes frequency instruction value; the magnetic pole position detector 400 detects the position of the magnetic poles at every 60° of electrical angle. The position detection value θi at this time is represented in the present embodiment by the equation as follows:

$$\theta i = 60i + 30 \quad (200)$$

In equation 200, I=0, 1, 2, 3, 4, 5. The frequency calculating unit 500 calculates the frequency instruction value ω1* which is an averaged rotational speed for a period of at least 60° from the position detected value θi in accordance with equation (300).

$$\omega_1^* = \frac{\Delta\theta}{\Delta t} \quad (300)$$

In equation (300), $\Delta\theta$ denotes $\theta i - \theta(i-1)$; $\Delta t$ is a period of time which is taken to detect a position detection signal in an interval of 60°. The phase operating unit 600 calculates the rotational phase instruction θc* by using the position detected value θi and frequency instruction value ω1 in accordance with equation (400) for controlling the reference phase of the motor 1.

$$\theta^* = \theta i + \omega 1^* \cdot \Delta t \quad (400)$$

The basic operation of the voltage and phase control in the vector control apparatus of the permanent magnet synchronization motor of the present invention has been described.

Figure 13:
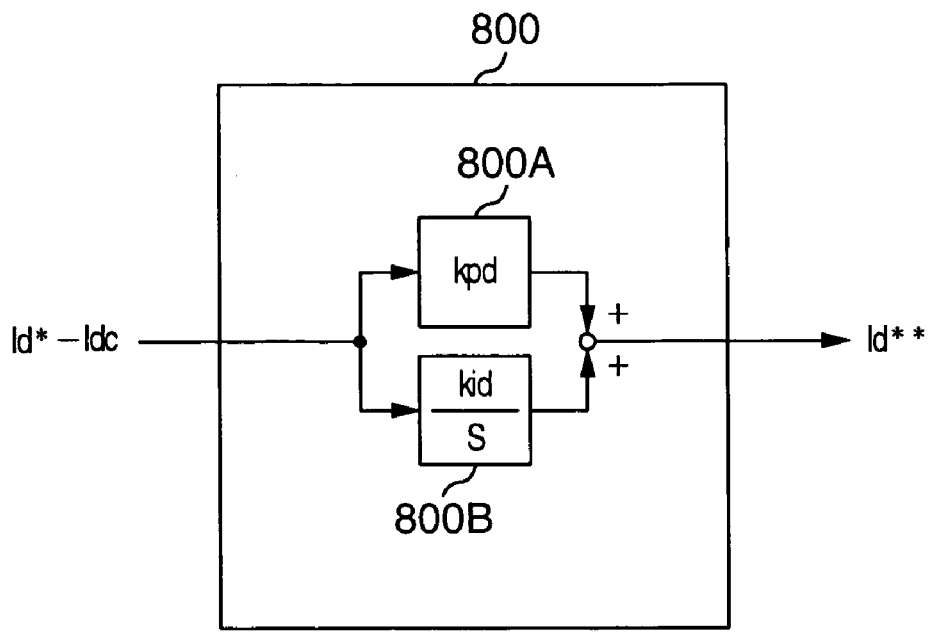
FIG. 13 shows a d-axis current instruction operating unit 8 in the control apparatus of FIG. 1.

Now, the configuration of the d-axis current instruction operating unit 800 and the q-axis current instruction operating unit 900 which is one of the features of the present invention will be described. The configuration of the d-axis current instruction operating unit 800 is illustrated in FIG. 13. The proportional operating unit 800A multiplies the difference between the first current instruction value Id* which is given from the host apparatus and the current detection value Idc by the proportional gain Kpd. The output from the proportional operating unit 800A is added with the output from the integration operating unit 800B which conducts an integration operation by multiplying the difference by an integration gain Kid for outputting the second d-axis current instruction Id**.

$$Id^{**} = (Id^* - Idc) \cdot \left(Kpd + \frac{Kid}{s}\right) \quad (500)$$

Figure 14:
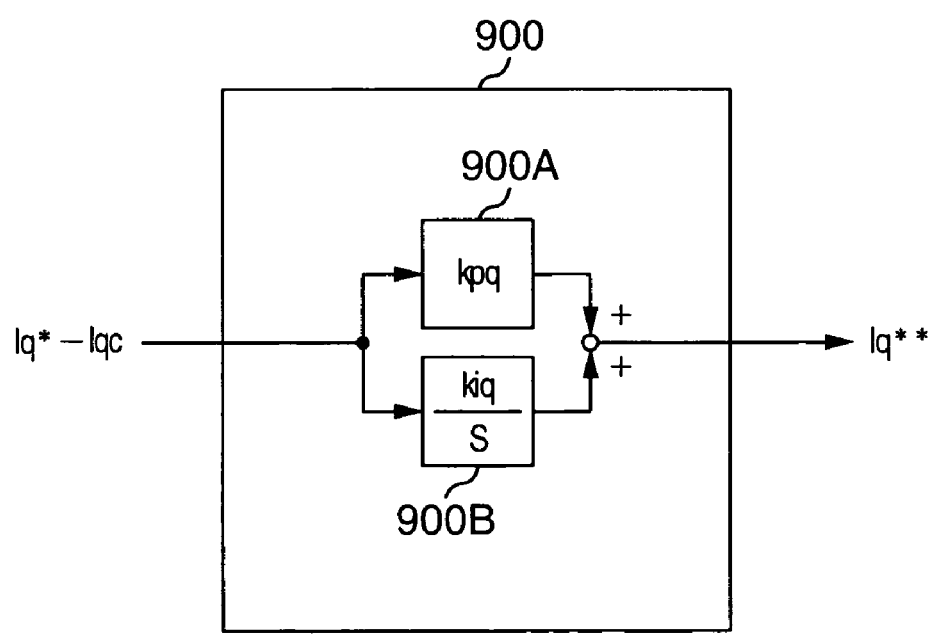
FIG. 14 shows a q-axis current instruction operating unit 9 in the control apparatus of FIG. 1.

The configuration of the q-axis current instruction operating unit 900 is illustrated in FIG. 14. The proportional operating unit 900A multiplies the difference between the first current instruction value Iq* which is given from the host apparatus and the current detection value Iqc by a proportional gain Kpq. The output of the proportional operating unit 900A is added with the output from the integration operating unit 900B which conducts an integration operation by multiplying the difference by an integration gain Kiq for outputting the second q-axis current instruction Iq**.

$$Iq^{**} = (Iq^* - Iqc) \cdot \left(Kpq + \frac{Kiq}{s}\right) \quad (600)$$

Herein a proportion plus integration operation is conducted in the d-axis current instruction operating unit 800 and q-axis current operating unit 900. Only proportion or integration operation can provide similar effect.

Now, an effect and operation of the present invention will be described by way of the present embodiment.

A case in which the first d- and q-axis current instruction values Id*, Iq* are input to the voltage vector operating unit 1000 in the control system of FIG. 12 will be considered (the second current instruction values Id, Iq are not used for the arithmetic operation). The vector operating unit 1000 calculates the voltage instruction values Vd*, Vq* in accordance with equation (700).

$$\begin{pmatrix} Vd^* = R_1^* \cdot Id^* - \omega_1^* \cdot Lq^* \cdot Iq^* \\ Vq^* = R_1^* \cdot Iq^* + \omega_1^* \cdot Ld^* \cdot Id^* + \omega_1^* \cdot Ke^* \end{pmatrix} \quad (700)$$

If a higher torque is required when the torque control is carried out in accordance with vector operation of equation (700), it is necessary to provide a high current consistent with the torque. If higher torque is continuously required for an extended period of time, the resistance R of the winding in the motor increases with lapse of time due to heat generation by a current flowing through the motor. Since the preset resistance value R* which is calculated in the voltage vector operating unit 1000 becomes unequal to the actual resistance value R, the voltage which is required by the motor 1 can not be supplied. As a result, a current which is required for generating necessary torque does not flow particularly in a low speed range, so that a shortage of torque occurs.

Figure 20:
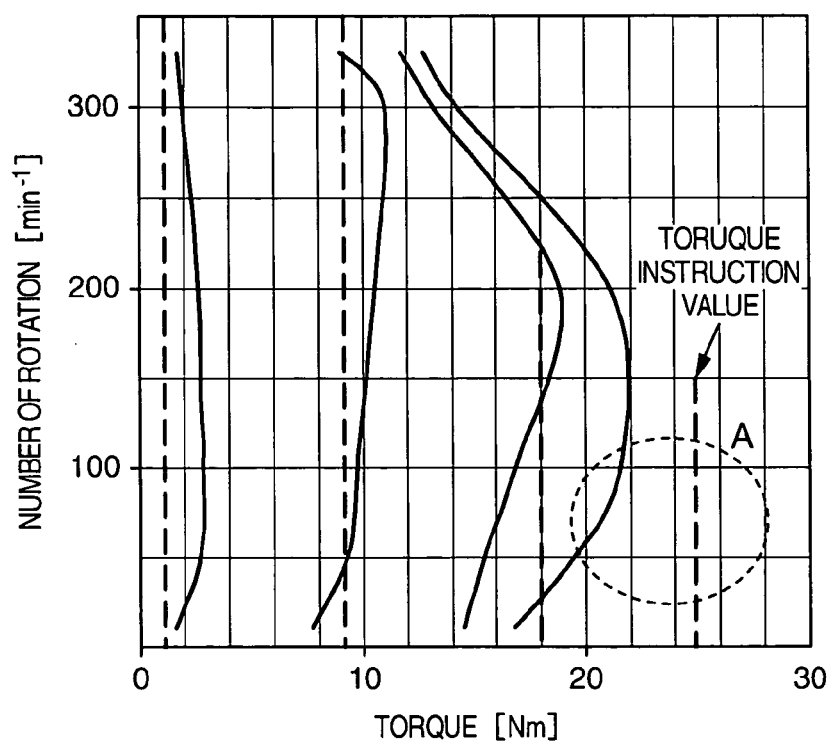
FIG. 20 shows the relationship between the number of rotations and the measured torque when the present invention is not used.

FIG. 20 shows the relation between measured motor torque and the number of rotation when the vector operation is conducted in accordance with equation (700). In the drawing, a broken line denotes the instructed torque value and a solid line denotes measured motor torque value. It is found that a torque as is instructed is not generated in the range of high torque and low speed (range A) which is encircled by a broken line. Second current instruction values Id, Iq are calculated in the current instruction operating units 800, 900 so that the d- and q-axis current detection values Idc, Iqc are equal to respective instruction values which are provided by the host apparatus. The voltages output from the converter are calculated in accordance with equation (700).

As a result, even if R* which is preset in the voltage vector operating unit 1000 is not equal to actual resistance value R, the output voltages can be controlled so that the motor currents equal to current instruction values. High precision torque control can be achieved in a whole range of speeds.

Figure 21:
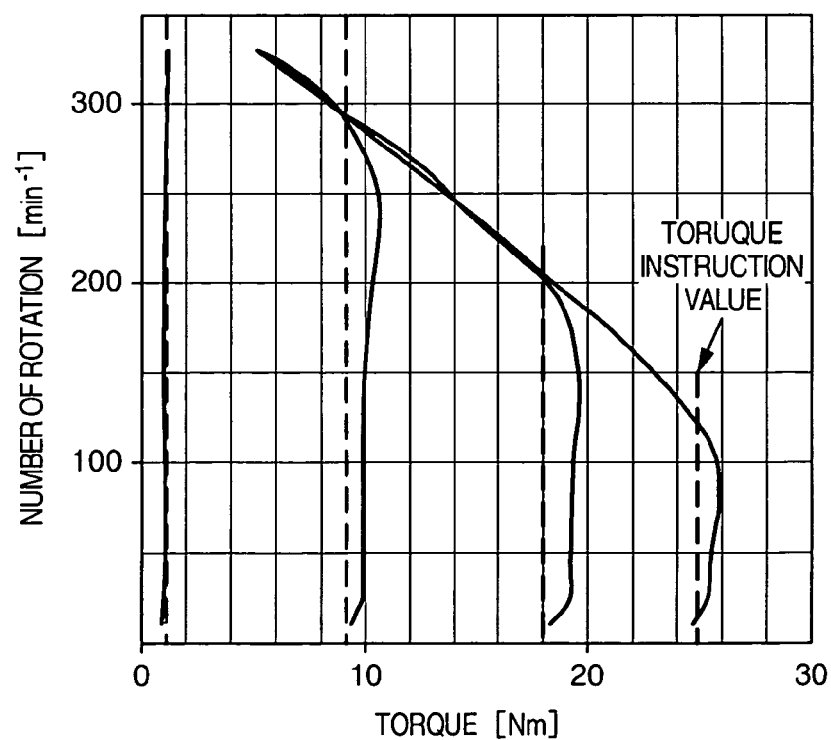
FIG. 21 shows the relationship between the number of rotations and the measured torque when the present invention is used.

FIG. 21 shows a result of measurement in the present embodiment. Broken lines in FIGS. 20 and 21 denote torque instruction values. Solid lines denote actual torque values which are measured for respective torque instruction values. Comparison of FIG. 20 with FIG. 21 shows the actual torque values in the present embodiment of FIG. 21 follow the instruction values at a higher precision than that in FIG. 20. In particular, it is found that the actual torque values follow the instructed torque value in a low speed range of about 25 [Nm] at a precision which is at most 8 [Nm] higher in FIG. 21 than in FIG. 20. In other words, it is found that a torque as is instructed is generated in a low speed and high torque range in FIG. 21 showing the experiment result of the present embodiment.

It is possible to cause the actual torque to follow the instructed torque values at a high precision over a whole speed range. Higher torque output can be achieved particularly in a low speed range.

Tenth Embodiment

Figure 15:
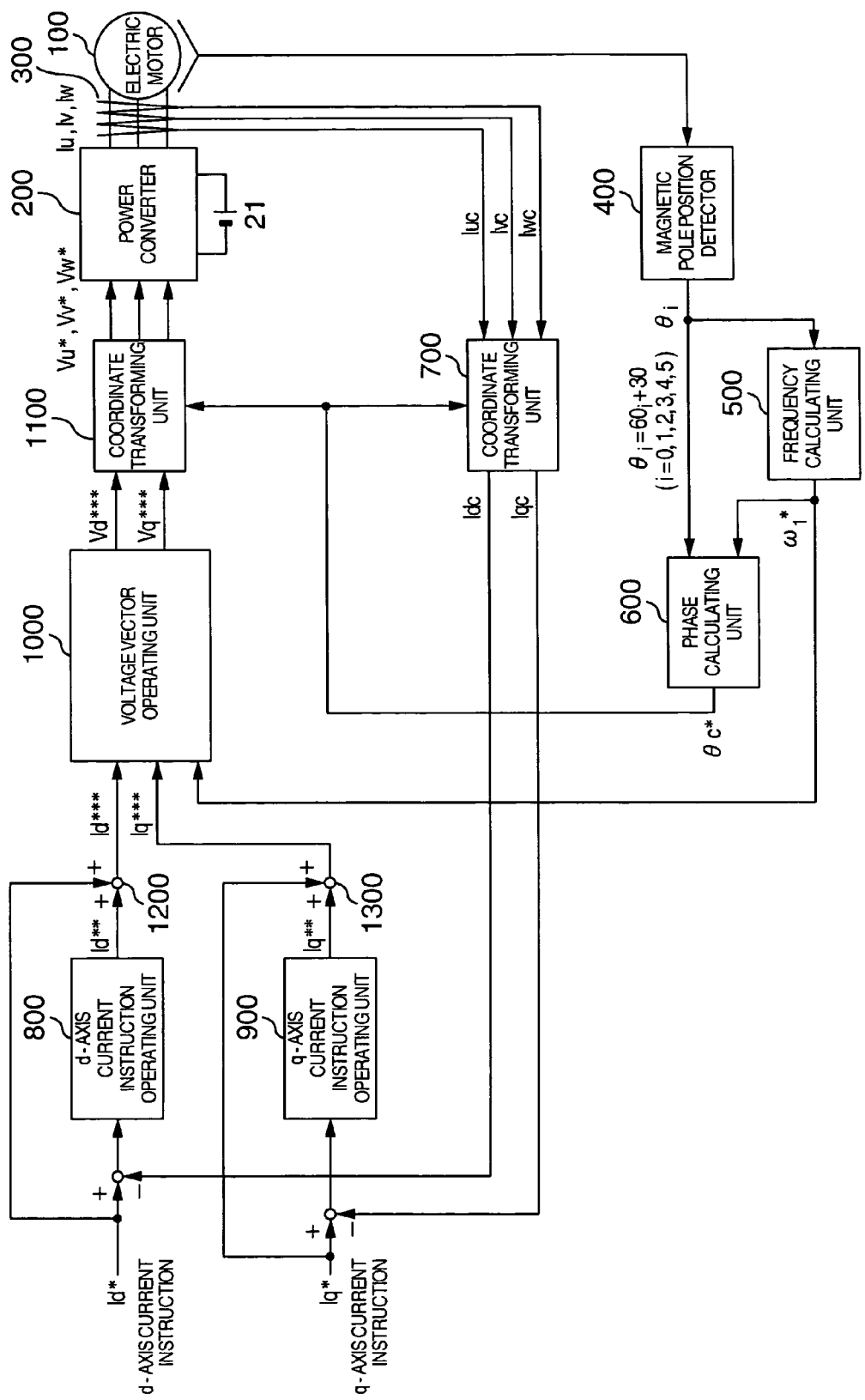
FIG. 15 shows an apparatus for controlling the permanent magnet synchronization motor of a further embodiment of the present invention.

FIG. 15 shows a tenth embodiment of the present invention. In tenth embodiment, a control system for a permanent magnet synchronization motor is provided in which the second current instruction values Id*, Iq* are obtained from sums of the first d- and q-axis current values Id*, Iq* and the output values Id, Iq of the current instruction operating units 800, 900, respectively.

In FIG. 15, components which is represented as 100 to 1100, 2100 are identical with those in FIG. 12. A reference numeral 1200 denotes an adding unit for adding the first d-axis current instruction value Id* to the output value Id of the d-axis current instruction operating unit 800; 1300** denotes an adding unit for adding the first q-axis current instruction value Iq* and the output value Iq of the q-axis current instruction operating unit 900. The voltage instruction values Vd*, Vq* which are represented by equation (800) are calculated using the current instruction values Id*, Iq*** which are calculated by this method for controlling the output voltage of the converter.

$$\begin{cases} Vd^{***} = R_1^* \cdot Id^{***} - \omega_1^* \cdot Lq^* \cdot Iq^{*} \\ Vq^{*} = R_1^* \cdot Iq^{***} + \omega_1^* \cdot Ld^* \cdot Id^{***} + \omega_1^* \cdot Ke^* \end{cases} \quad (800)$$

In this system, the current instruction values which are proportional to a torque to be generated are principally supplied from Id*, Iq*.

Even if the motor constants which are preset in the vector operating unit 1000 do not match the actual values of the motor, high precision torque control can be achieved over the entire range of speeds since the current instruction values are calculated by the current instruction operating units 800, 900 so that the motor currents match the current instruction values (or compensate for excessive or insufficient currents). Considering that Id* and Iq* are equal to Idc and Idq, respectively, it is apparent that the present invention provides similar effects and operation of the previous embodiments.

If the period of the sampling operation is long, the control gain can not be increased, so that high response can not be achieved. However, it is possible to increase the response by conducting a feedfoward control in the present embodiment.

Eleventh Embodiment

Figure 16:
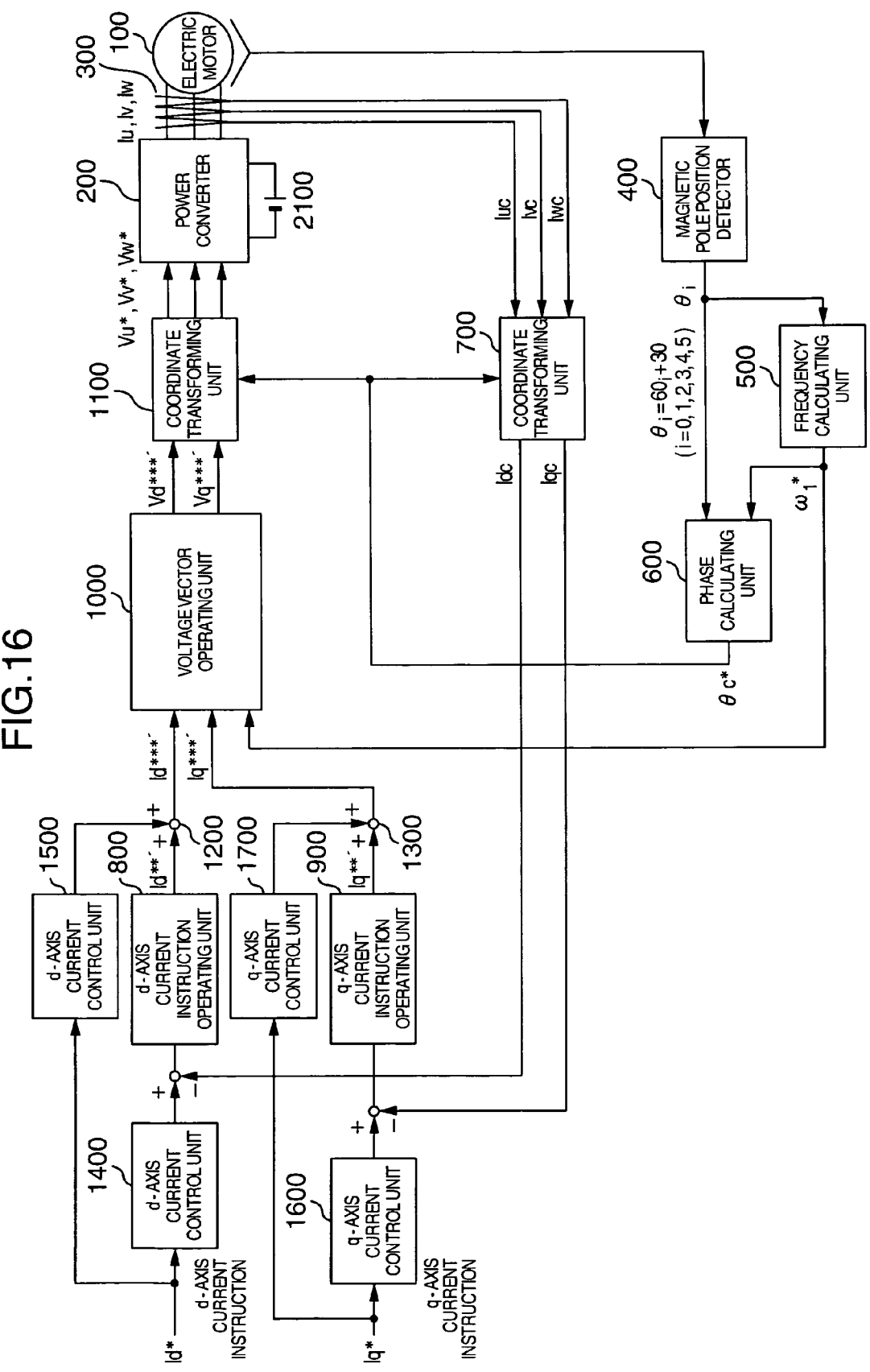
FIG. 16 shows an apparatus for controlling the permanent magnet synchronization motor of a further embodiment of the present invention.

FIG. 16 shows an eleventh embodiment of a control system for the permanent magnet synchronization motor in which the second current instruction values Id*', Iq*' are obtained from a signal of time lag or advance of first order of the first d- and q-axis current instruction values Id*, Iq* and the sums of the signals of time lag of first order of the current instruction values Id*, Iq* and the current instruction values Id', Iq' which are calculated from the detected current values Idc, Iqc.

Components which are represented as 100 to 1100, 2100 in FIG. 16 are identical with those 100 to 1100, 2100 in FIG. 12. A reference numerals 1200 denote an adding unit for adding the output value Id** of the d-axis current instruction operating unit 800 to the d-axis first current instruction value Id*; 1300 denotes an adding unit for adding the output value Iq of the q-axis current instruction operating unit 900 to the q-axis first current instruction value; 1400 denotes a filter of time lag of first order having a time lag constant Td1; 1500 denotes a filter of time lag and advance of first order having a gain of a time lag constant Td1 and a time advance constant Td2; 1600 denotes a filter of time lag of first order having a lag time constant Tq1; and 1700 denotes a filter of time lag and advance of first order having a lag time constant Tq1 and an advance time constant Tq2. The voltage instruction values Vd*', Vq*' which are represented as equation (900) are calculated using the current instruction values Id*', Iq***' which are calculated by this method, for controlling the voltages output from the converter.

$$\begin{cases} Vd^{***'} = R_1^* \cdot Id^{***'} - \omega_1^* \cdot Lq^* \cdot Iq^{*'} \\ Vq^{*'} = R_1^* \cdot Iq^{***'} + \omega_1^* \cdot Ld^* \cdot Id^{***'} + \omega_1^* \cdot Ke^* \end{cases} \quad (900)$$

The proportional gains (Kpd, Kpq) and integral gains (Kid, Kiq) of the d- and q-axis current instruction operating units 800, 900 are preset as is shown in equation (1000).

$$\begin{cases} Kpd = \dfrac{Ld^*}{R^*} \cdot \omega cd \\ Kid = \omega cd \\ Kpq = \dfrac{Lq^*}{R^*} \cdot \omega cq \\ Kiq = \omega cq \end{cases} \quad (1000)$$

wherein ωcd, ωcq denote d- and q-axis control response angular frequency [rad/s] and Ld, Lq denote inductances of the motor; and R denotes the resistance of the motor. T1d, T2d, T1q, T2q are expressed as execution (1100) in operating units 1400 to 1700.

$$\begin{cases} T1d = \dfrac{1}{\omega cd} \\ T2d = \dfrac{Ld^*}{R^*} \\ T1q = \dfrac{1}{\omega cd} \\ T2q = \dfrac{Lq^*}{R^*} \end{cases} \quad (1100)$$

Since the current control response from the current instruction values Id*, Iq* to the current detection values Idc, Iqc can be defined with a time lag of first order as expressed by equation (1200), it is possible to construct an overshootless torque control system.

$$\begin{cases} \dfrac{Idc}{Id^*} = \dfrac{1}{1 + \dfrac{1}{\omega cd} \cdot s} \\ \dfrac{Iqc}{Iq^*} = \dfrac{1}{1 + \dfrac{1}{\omega cq} \cdot s} \end{cases} \quad (1200)$$

By considering the fact that Id* and Iq* are equal to Idc and Iqc, respectively in even such a system, it is apparent that the present embodiment provides effects and operation similar to that of the previous embodiment and that an overshootless torque control system can be constructed.

Twelfth Embodiment

Figure 17:
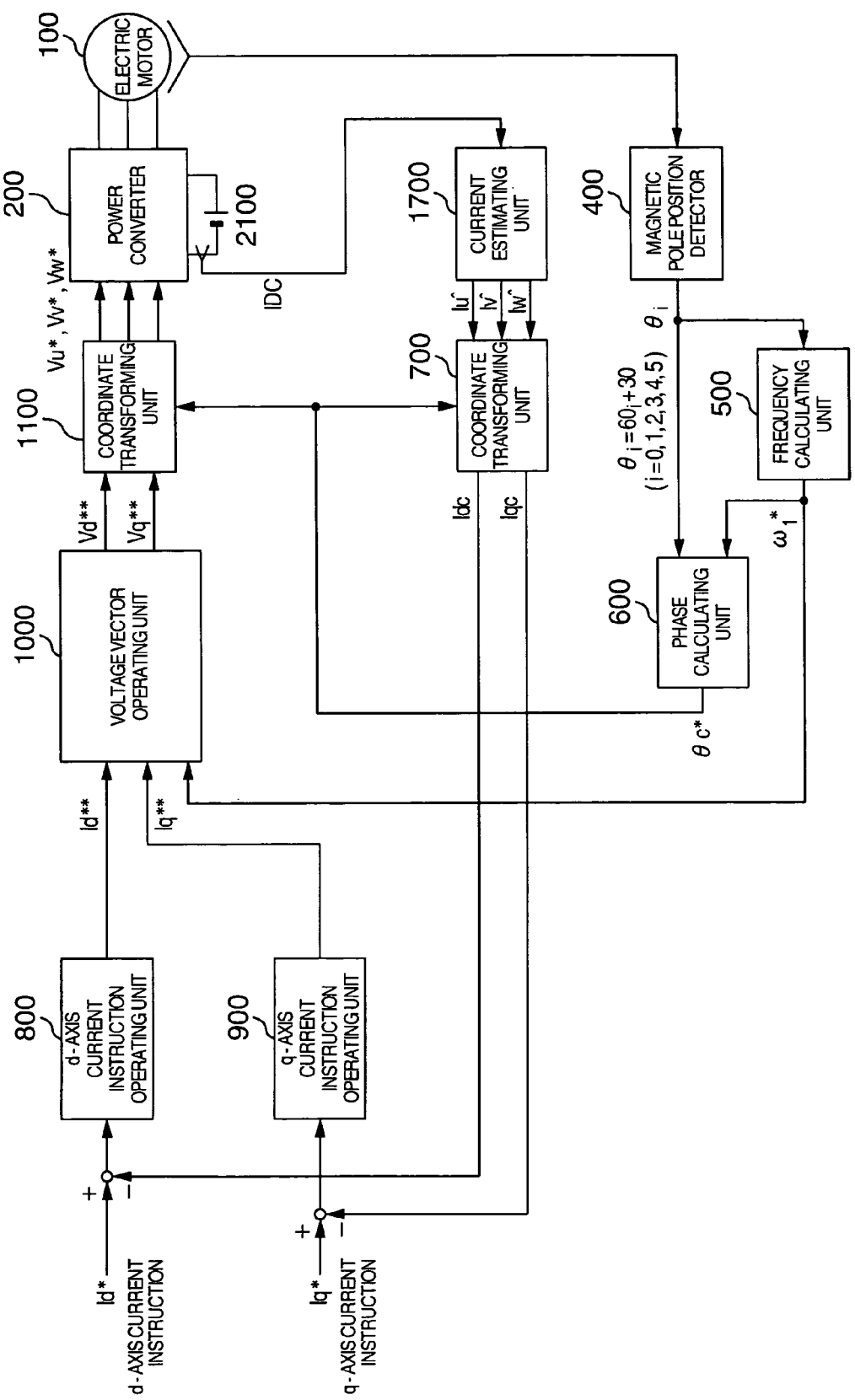
FIG. 17 shows an apparatus for controlling the permanent magnet synchronization motor of a further embodiment of the present invention.

Three-phase a. c. currents Iv to Iw are detected in the expensive current detector 300 in the embodiments 9 to 11. However, current detection can be conducted without using any current detector in the present embodiment. The twelfth embodiment is shown in FIG. 17. Components which are represented as 100, 200, 400 to 1100 and 2100 in FIG. 17 are identical with those represented as 100, 200, 400 to 1100 and 2100 in FIG. 12, respectively. A reference numeral 1700 denotes a current estimating unit for estimating three-phase a. c. currents Id, Iv, Iw flowing through the synchronization moor based upon a d. c. current IDC flowing through the input bus line (d. c. shunt resistor) of the power converter.

The d- and q-axis current detection values Idc, Iqc are calculated using the estimated current values Iu^, Iv^, Iw^ in coordinate transforming unit 700. Since Id* and Iq* are equal to Idc and Iqc, respectively, in even such a system, effect and operation similar to the previous embodiment can be provided.

Since Idc, Iqc are determined by means of a d. c. shunt resister which is preliminarily incorporated for preventing an overcurrent in lieu of a current detector, control can be carried out with less current detector.

Thirteenth Embodiment

Figure 18:
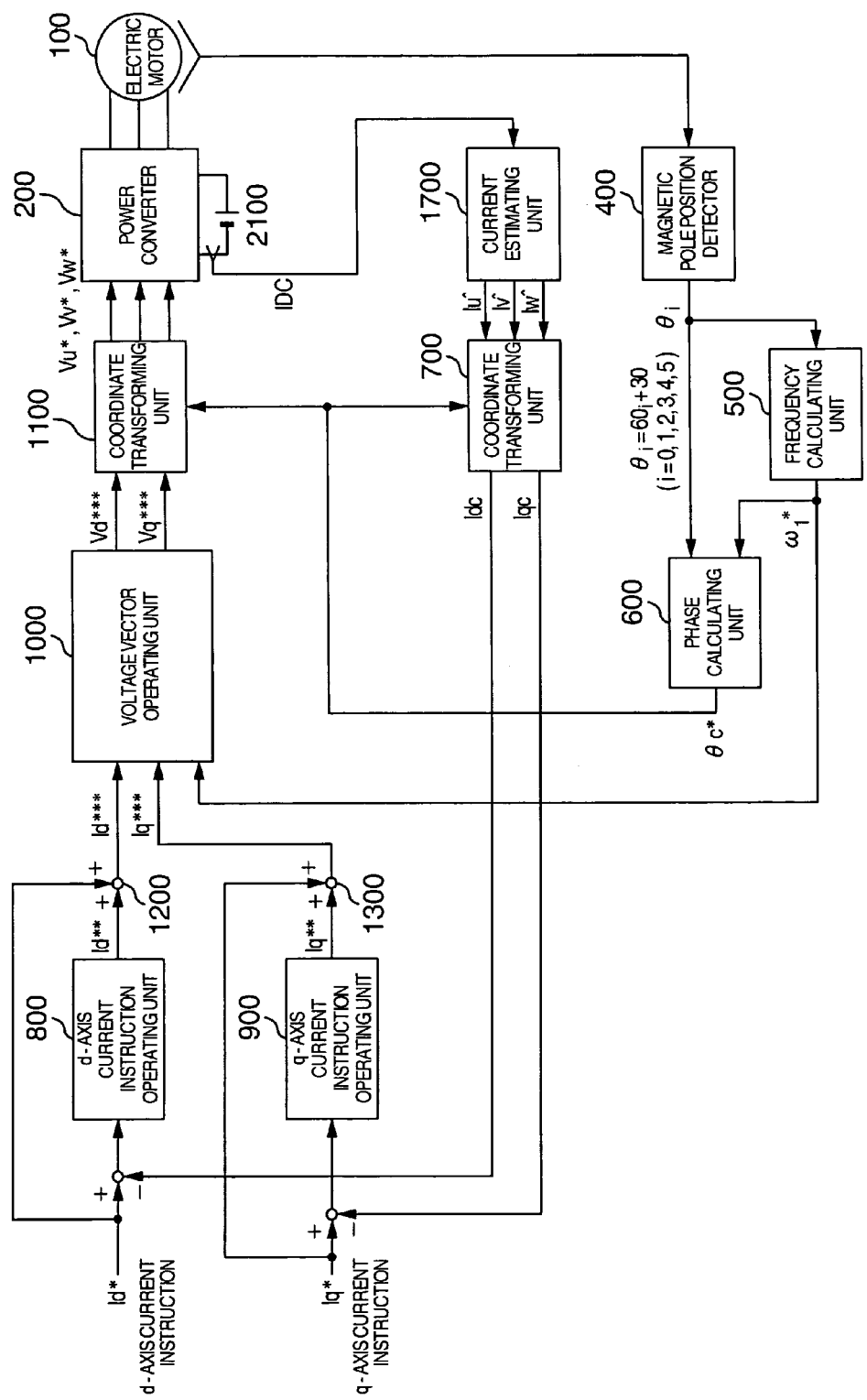
FIG. 18 shows an apparatus for controlling the permanent magnet synchronization motor of a further embodiment of the present invention.

Thirteenth embodiment is an embodiment in which the control system of FIG. 15 is applied to a control system which detects a current in an economical manner. The thirteenth embodiment is shown in FIG. 18. Components which are represented as 100, 200, 400 to 1100 and 2100 in FIG. 18 are identical with components represented as 100, 200, 400 to 1100 and 2100 in FIG. 15, respectively. A reference numeral 1700 denotes a current estimating unit for estimating three-phase a. c. currents Iu, Iv, Iw flowing through the synchronization motor based upon a d. c. current IDC flowing through the input bus line (d. c. shunt resistor) of the power converter.

The d- and q-axis current detection values Idc, Iqc are calculated using the estimated current values Iuˆ, Ivˆ, Iwˆ in the coordinate transforming unit 700. Since Id* and Iq* are equal to Idc and Iqc, respectively in even such a system, effect and operation similar to the previous embodiments can be provided. Since Idc, Iqc are determined by means of a d. c. shunt resister which is preliminarily incorporated for preventing an overcurrent in lieu of a current detector, control can be carried out with less current detector.

Fourteenth Embodiment

Figure 19:
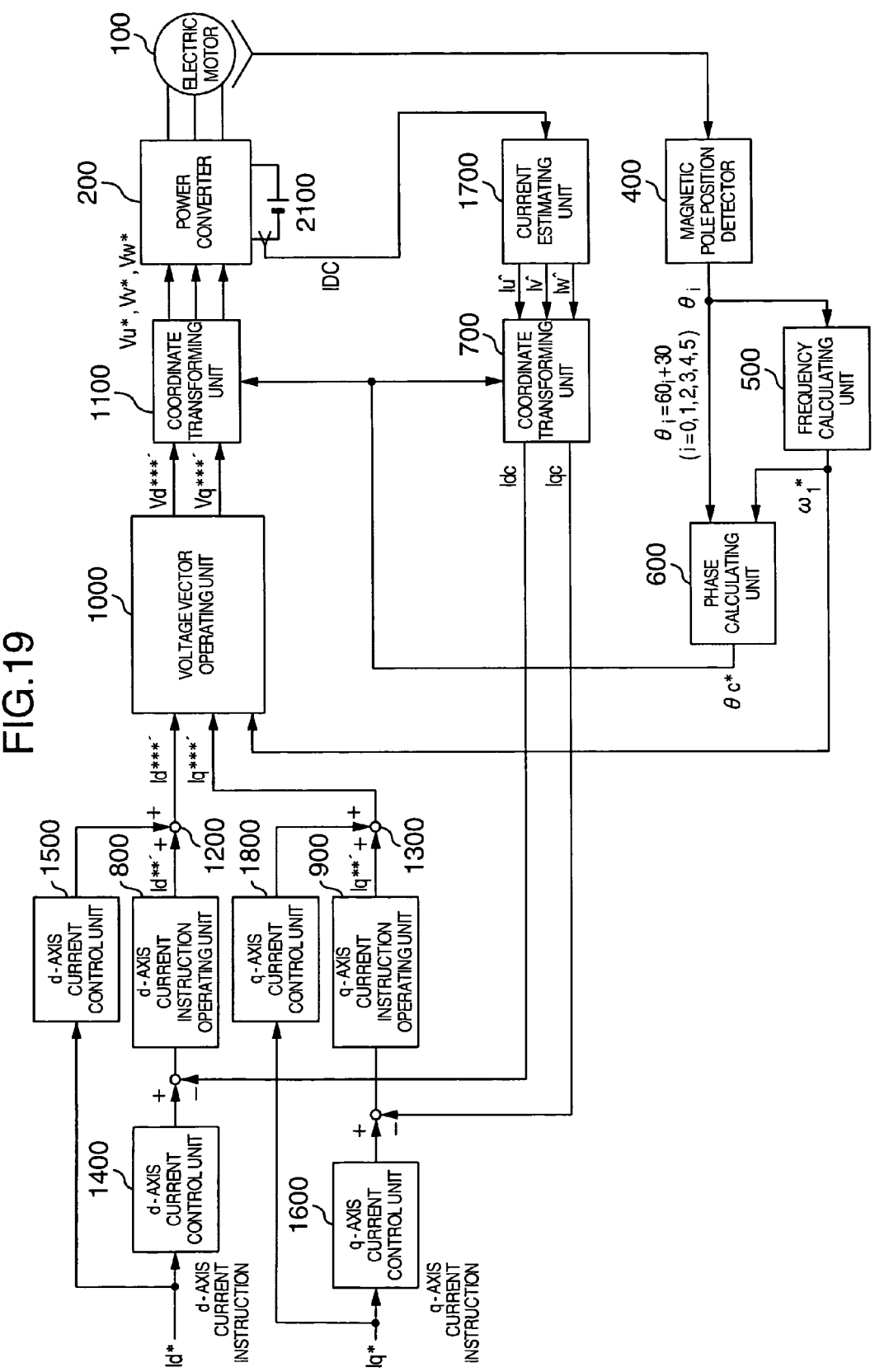
FIG. 19 shows an apparatus for controlling the permanent magnet synchronization motor of a further embodiment of the present invention.

Fourteenth embodiment is an embodiment in which the control system of FIG. 16 is applied to a control system which detects a current in an economical manner. The fourteenth embodiment is shown in FIG. 19. Components which are represented as 100, 200, 400 to 1100 and 2100 in FIG. 19 are identical with components represented as 100, 200, 400 to 1100 and 2100 in FIG. 16, respectively. A reference numeral 1700 denotes a current estimating unit for estimating three-phase a. c. currents Iu, Iv, Iw flowing through the synchronization motor based upon a d. c. current IDC flowing through the input bus line (d. c. shunt resistor) of the power converter. The d- and q-axis current detection values Idc, Iqc are calculated using the estimated current values Iuˆ, Ivˆ, Iwˆ in the coordinate transforming unit 700. Since Id* and Iq* are equal to Idc and Iqc, respectively in even such a system, effect and operation similar to the previous embodiments can be provided.

Since Idc, Iqc are determined by means of a d. c. shunt resister which is preliminarily incorporated for preventing an overcurrent in lieu of a current detector, control can be carried out with less current detector.

Fifteenth Embodiment

Figure 22:
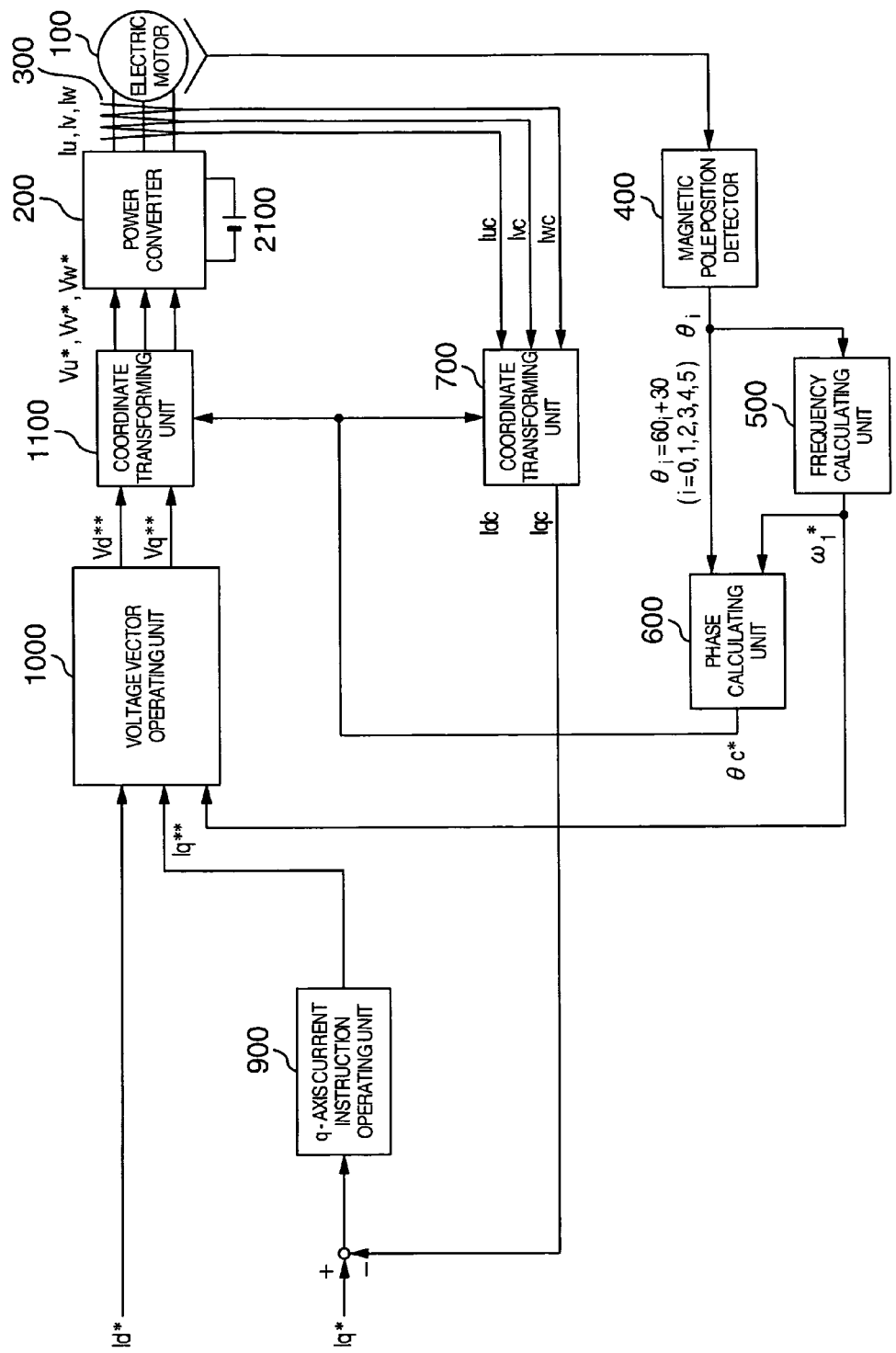
FIG. 22 shows an apparatus for controlling the permanent magnet synchronization motor of a further embodiment of the present invention.

FIG. 22 shows a fifteenth embodiment of a control system of a permanent magnet synchronization motor of the present invention in which a voltage vector operation is conducted by using the first and second current instruction values Id and Iq on the d- and q-axis sides, respectively. Components which are represented as 100, 700, 800 to 1100 and 2100 in FIG. 22 are similar to those represented as 100 to 7.00, 800 to 1100 and 2100 in FIG. 12, respectively.

Since Iq* is equal to Iqc in this method if the d-axis current instruction value is zero (Id*=0), effect and operation similar to that of the previous embodiments can be obtained.

In accordance with the present invention, there is provided a control system for an a. c. motor which does not cause shortage of torque in the low speed range without being influenced by variations in motor constants and mounting error of a Hall-effect element.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An apparatus for controlling an a. c. electric motor comprising:
   current estimating means for receiving detected input d. c. currents from a power converter for converting d. c. power into a. c. power and a rotational phase which is obtained from a signal of detected position of the a. c. motor for outputting estimated current values of the a. c. motor on d- and q-axes of a rotational coordinate system of the motor;
   d-axis current controlling means for controlling a d-axis current so that said estimated current value approaches a d-axis current instruction value; and
   q-axis current controlling means for controlling a q-axis current so that said estimated current value approaches a q-axis current instruction value.

2. An apparatus as defined in claim 1 and further comprising
   speed operating means for receiving said input detected position signal for outputting a rotational speed of the a. c. current of said a. c. motor;
   voltage vector operating means for outputting d- and q-axis first output voltage reference values based upon constants of said a. c. motor, said estimated current values and said rotational speed or the constants of said a. c. motor, current instruction values and said rotational speed; and
   adding means for adding signals output from said d-axis current control means and said q-axis current control means to the first output voltage reference value for outputting d- and q-axis second output voltage reference values.

3. An apparatus for controlling an a. c. electric motor comprising:
   current estimating means for receiving detected input d. c. currents from a power converter for converting d. c. power into a. c. power and a rotation phase which is obtained from a signal of detected position of the a. c. motor for outputting estimated current values of the a. c. motor on d- and q-axes of a rotational coordinate system of the motor,;
   d-axis current instruction operating means for controlling a first d-axis current so that said estimated current value approaches a first d-axis current instruction value to output a second d-axis current instruction value;
   q-axis current instruction operating means for controlling a first q-axis current so that said estimated current value approaches a first q-axis current instruction value to output a second q-axis current instruction value; and
   voltage vector operating means for receiving a rotational speed obtained from said second d-axis current instruction value, said second q-axis current instruction value, said a. c. motor constants and said position detection signal for outputting d- and q-axis output voltage reference values.

4. A module comprising an apparatus for controlling an a. c. motor as defined in claim 1 and a power converter for converting a direct current into an alternating current.

5. An apparatus for controlling an a. c. electric motor comprising:
   motor current detecting means for detecting motor currents flowing through the a. c. motor for outputting the motor currents on d- and q-axis of a rotation coordinate system from said detected motor current values and a rotational phase instruction;
   axial error operating means for receiving d- and q-axis output voltage reference values and said d- and q-axis motor currents for outputting a first phase error between said rotational phase instruction and the rotational phase of said a. c. motor;
   subtracting means for receiving a position detection signal and said rotational phase instruction for outputting a second phase error;
   combining means for receiving said first and second phase errors for outputting a third phase error therebetween;
   frequency operating means for outputting a frequency output from the power converter so that said third phase error approaches zero; and
   phase instruction operating means for receiving said output frequency for outputting said rotational phase instruction.

6. An apparatus as defined in claim 5 further comprising speed operating means for outputting the rotational speed of said electric motor from said position detection signal; and
   phase operating means for outputting the rotational phase from said rotational speed and said position detection signal,
   said subtracting means being provided to output said second phase error based upon said rotational phase and said rotational phase instruction.

7. An apparatus as defined in claim 5 further comprising q-axis inductance operating means for outputting a q-axis inductance value of said a. c. electric motor based upon said second phase error.

8. An apparatus as defined in claim 7 in which said q-axis inductance operating means generates a tangential and cosine signals of said second phase error, divides said tangential signal by said cosine signal, then multiplies a quotient by a reciprocal of induced electromotive voltage constants of said a. c. electric motor, and dividing a product by a q-axis current instruction value or current estimate value for calculating said q-axis inductance value.

9. An apparatus as defined in claim 7 in which an operation is conducted using said q-axis inductance value in said axial error operating means.

10. An apparatus as defined in claim 7 in which said output voltage reference value is operated using said q-axis inductance value.

11. An apparatus for controlling a permanent magnet synchronization motor as defined in claim 7 further comprising q-axis current control means or q-axis current instruction operating means, control constants of said q-axis current instruction operating means or control constants of said q-axis current instruction operating means being changed using said q-axis inductance value.

12. An apparatus as defined in claim 5 in which said motor current detecting means estimates said d- and q-axis motor currents from the detected input d. c. current values of said power converter.

13. A module comprising an apparatus for controlling an a. c. motor as defined in claim 5 and a power converter for converting a direct current into an alternating current.

14. An apparatus for controlling an a. c. electric motor comprising:
   motor current detecting means for detecting motor currents flowing through the a. c. motor for outputting the motor currents on d- and q-axis of a rotational coordinate system from said detected motor current values and a rotational phase instruction;
   axial error operating means for receiving d- and q-axis output voltage reference values and said d- and q-axis motor currents for outputting a first phase error between said rotational phase instruction and the rotational phase of said a. c. motor;
   frequency operating means for outputting a frequency output from a power converter so that said first phase error approaches zero;
   phase instruction operating means for receiving said output frequency for outputting said rotational phase instruction;
   subtracting means for outputting a second phase error which is a difference between said rotational phase instruction value and the rotational phase which is obtained from a position detection value of said a. c. motor; and
   q-axis inductance operating means for calculating the constants of said a. c. motor from said second phase error.

15. An apparatus as defined in claim 14 in which said motor current detecting means estimates said d- and q-axis motor currents from the detected input d. c. current values of said power converter.

16. A module comprising an apparatus for controlling an a. c. motor as defined in claim 14 and a power converter for converting a direct current into an alternating current.

17. A method of controlling an a. c. electric motor comprising the steps of:
   estimating currents flowing through said a. c. motor on d- and q-axis of a rotational coordinate system based upon detected d. c. current values input to a power converter which converts a direct current into alternating current and a rotational phase which is obtained from a position detection signal of said a. c. motor;
   controlling a d-axis current so that said estimated current value approaches a d-axis instruction value; and
   controlling a q-axis current so that said estimated current value approaches a q-axis instruction value.

18. A method as defined in claim 17 further comprising the steps of:
   operating and outputting a rotational speed of said a. c. motor based upon said position detection signal;
   operating voltage vectors for outputting d- and q-axis first output voltage reference values based upon constants of said a. c. motor, said estimated value and said rotational speed, or the constants of said a. c. motor, a current instruction value and said rotational speed; and
   calculating d- and q-axis second output voltage reference values by adding the signals output at said steps of controlling said d- and q-axis currents to said first output voltage reference value.

* * * * *